(12) United States Patent
Ikai et al.

(10) Patent No.: US 10,747,193 B2
(45) Date of Patent: Aug. 18, 2020

(54) MACHINE LEARNING APPARATUS, SERVO CONTROL APPARATUS, SERVO CONTROL SYSTEM, AND MACHINE LEARNING METHOD

(71) Applicant: FANUC CORPORATION, Yamanashi (JP)

(72) Inventors: Satoshi Ikai, Yamanashi (JP); Tsutomu Nakamura, Yamanashi (JP); Tomoyuki Aizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 86 days.

(21) Appl. No.: 15/997,043

(22) Filed: Jun. 4, 2018

(65) Prior Publication Data
US 2018/0373223 A1 Dec. 27, 2018

(30) Foreign Application Priority Data
Jun. 22, 2017 (JP) ................................ 2017-122449

(51) Int. Cl.
*G05B 19/404* (2006.01)
*G06N 3/08* (2006.01)
(Continued)

(52) U.S. Cl.
CPC .......... *G05B 19/404* (2013.01); *B23Q 15/12* (2013.01); *G05B 13/0245* (2013.01);
(Continued)

(58) Field of Classification Search
CPC .............. G05B 19/404; G05B 13/0245; G05B 2219/41386; G05B 2219/41078;
(Continued)

(56) References Cited

U.S. PATENT DOCUMENTS

| 6,611,823 B1* | 8/2003 | Selmic ................. G05B 13/027 700/44 |
| 2003/0030401 A1* | 2/2003 | Fujishima ............ G05B 19/404 318/632 |
| 2016/0070247 A1 | 3/2016 | Ohishi et al. |

FOREIGN PATENT DOCUMENTS

| CN | 1562563 | 1/2005 |
| CN | 103331310 | 10/2013 |

(Continued)

OTHER PUBLICATIONS

Y. H. Kim and F. L. Lewis, "Reinforcement adaptive learning neural network based friction compensation for high speed and precision," Proceedings of the 37th IEEE Conference on Decision and Control, vol. 1, pp. 1064-1069, 1998 (Year: 1998).*

(Continued)

*Primary Examiner* — Robert E Fennema
*Assistant Examiner* — Shon G Foley
(74) *Attorney, Agent, or Firm* — Wenderoth, Lind & Ponack, L.L.P.

(57) ABSTRACT

To perform reinforcement learning enabling to prevent complicated adjustment of coefficients of backlash compensation and backlash acceleration compensation. A machine learning apparatus includes a state information acquiring part for acquiring, from a servo control apparatus, state information including at least position deviation and a set of coefficients to be used by a backlash acceleration compensating part, by making the servo control apparatus execute a predetermined machining program, an action information output part for outputting action information including adjustment information on the set of coefficients included in the state information to the servo control apparatus, a reward output part for outputting a reward value in the reinforcement learning on the basis of the position deviation included in the state information, and a value function updating part (Continued)

for updating an action-value function on the basis of the reward value output by the reward output part, the state information and the action information.

6 Claims, 16 Drawing Sheets

(51) Int. Cl.
*G06N 3/04* (2006.01)
*G05B 13/02* (2006.01)
*B23Q 15/12* (2006.01)
*G06N 3/00* (2006.01)
*G06N 20/00* (2019.01)

(52) U.S. Cl.
CPC ......... *G05B 13/0265* (2013.01); *G06N 3/006* (2013.01); *G06N 3/0454* (2013.01); *G06N 3/08* (2013.01); *G06N 20/00* (2019.01); *G05B 2219/41032* (2013.01); *G05B 2219/41054* (2013.01); *G05B 2219/41078* (2013.01); *G05B 2219/41386* (2013.01)

(58) Field of Classification Search
CPC ........... G05B 2219/41032; G05B 2219/41054; G05B 13/0265; G05B 19/4163; G05B 2219/36521; G06N 3/08; G06N 3/0454; G06N 3/006; G06N 20/00; B23Q 15/12
See application file for complete search history.

(56) References Cited

FOREIGN PATENT DOCUMENTS

| | | |
|---|---|---|
| CN | 106239257 | 12/2016 |
| CN | 106338970 | 1/2017 |
| JP | 2011-221612 | 11/2011 |
| JP | 2012-93982 | 5/2012 |
| JP | 2017-64837 | 4/2017 |

OTHER PUBLICATIONS

Office Action dated Aug. 23, 2019 in Chinese Patent Application No. 201810638894.5.

* cited by examiner

MACHINE LEARNING APPARATUS, SERVO CONTROL APPARATUS, SERVO CONTROL SYSTEM, AND MACHINE LEARNING METHOD

This application is based on and claims the benefit of priority from Japanese Patent Application No. 2017-122449, filed on 22 Jun. 2017, the content of which is incorporated herein by reference.

BACKGROUND OF THE INVENTION

Field of the Invention

The present invention relates to a machine learning apparatus, a servo control apparatus including the machine learning apparatus, and a servo control system including a machine learning apparatus and a servo control apparatus, as well as a machine learning method. In the machine learning apparatus, reinforcement learning is performed to the servo control apparatus for executing backlash compensation control and backlash acceleration compensation control, with respect to a backlash compensation parameter in the backlash compensation control and/or a backlash acceleration compensation parameter in the backlash acceleration compensation parameter.

Related Art

Conventionally, a servo motor has been used in a control system in which the position, orientation, attitude and the like of an object are used as control amounts, for example, in a control system of a machine tool or an industrial machine. Mechanical elements are engaged with each other for transmitting the rotation of the motor shaft of the servo motor to another main shaft, and clearance is intentionally disposed between the contact surfaces of such mechanical elements. The disposed clearance allows the mechanical element such as a screw or a gear to freely rotate in a certain range. The clearance is called "backlash."

For example, in the case where a motor and a shaft to be driven such as a main shaft are coupled by a gear, when the motor is reversed, the backlash of the gear causes a delay in the reversing of the shaft to be driven against the reversing of the motor. In a conventional method to compensate for the delay in the reversing of the shaft to be driven, a backlash compensation value is added to a position command to be transmitted to the motor. This is called "backlash compensation."

On the other hand, for example, influence of static friction or the like on the shaft to be driven may cause a delay in the reversing of the shaft to be driven against the reversing of the motor, in some cases. In a conventional method to compensate for the delay in the reversing of the shaft to be driven, when the motor is reversed, a compensation value is added to a speed command or a torque command instead of the position command. This is called "backlash acceleration compensation."

One example of such a servo control apparatus using backlash compensation control and backlash acceleration compensation control is the servo control apparatus disclosed in Patent Document 1. The servo control apparatus disclosed in Patent Document 1 serving as a compensation parameter adjustment apparatus is configured to include an accelerometer for measuring the acceleration of a machine, a mechanical operation analyzing part for analyzing mechanical operation, and a compensation parameter calculating part for determining a backlash compensation parameter and the like to improve accuracy in the mechanical operation, so as to measure the operation locus of the machine in an actual use state without removing a jig and/or a tool and separate an error factor, thereby allowing appropriate setting of a compensation parameter.

Patent Document 1: Japanese Unexamined Patent Application, Publication No. 2011-221612

SUMMARY OF THE INVENTION

As described above, in some cases, position deviation may occur in the servo control apparatus when the influence of nonlinear characteristics such as friction, ricketiness, and lost motion of the machine causes a change in a value of the position command or the speed command. In such a case, backlash compensation and backlash acceleration compensation are performed for complicated shapes according to time and distance (hereinafter also referred to as "complicated shapes"), thereby enabling to reduce position deviation and speed deviation and to improve followability to a position command and a speed command. However, as the backlash compensation and the backlash acceleration compensation are performed for more complicated shapes, it becomes more difficult to adjust parameters (also referred to as "coefficients") for use in the backlash compensation and the backlash acceleration compensation.

The object of present invention is to provide a machine learning apparatus for performing reinforcement learning in a servo control apparatus using backlash compensation and backlash acceleration compensation, enabling to prevent complicated adjustment of coefficients of the backlash compensation and the backlash acceleration compensation, in the case where the backlash compensation and the backlash acceleration compensation are performed for complicated shapes so as to reduce position deviation and speed deviation and improve followability to a position command as well as provide the servo control apparatus and a servo control system including the machine learning apparatus, and a machine learning method thereof.

(1) A machine learning apparatus according to the present invention (for example, a "machine learning apparatus 200" described below) performs reinforcement learning to a servo control apparatus with respect to at least one of a backlash compensation parameter in a backlash compensating means (for example, a "backlash compensating part 109" described below) and a backlash acceleration compensation parameter in a backlash acceleration compensating means (for example, a "backlash acceleration compensating part 110" described below). The servo control apparatus includes at least one of the backlash compensating means for creating a backlash compensation value with respect to a position command or a position deviation and the backlash acceleration compensating means for creating a backlash acceleration compensation value with respect to a speed command. The machine learning apparatus includes action information output means (for example, an "action information output part 203" described below) for outputting action information including adjustment information on at least one of the backlash compensation parameter and the backlash acceleration compensation parameter to at least one of the backlash compensating means and the backlash acceleration compensating means, state information acquiring means (for example, a "state information acquiring part 201" described below) for acquiring, from the servo control apparatus, state information including at least either one of the backlash compensation parameter and the backlash acceleration compensation parameter, and position deviation obtained from the position command and a fed-back position, at a time of making the servo control apparatus execute a predetermined machining program on the basis of the action information, reward output means (for example, a "reward output part 2021" described below) for outputting a reward value in the reinforcement learning on the basis of the position deviation included in the state information, and value function updating means (for example, a "value function updating part 2022" described below) for updating an action-value function on the basis of the reward value, the state information, and the action information.

(2) In the machine learning apparatus according to (1), reinforcement learning may be performed first with respect to the backlash compensation parameter in the backlash compensating means, and then the reinforcement learning may be performed with respect to the backlash acceleration compensation parameter in the backlash acceleration compensating means.

(3) In the machine learning apparatus according to (1) or (2), the reward output means may output the reward value on the basis of the absolute value of the position deviation.

(4) The machine learning apparatus according to any one of (1) to (3) may include optimal action information output means (for example, an "optimal action information output part 205" described below) for generating and outputting at least one of the backlash compensation parameter in the backlash compensating means and the backlash acceleration compensation parameter in the backlash acceleration compensating means on the basis of the action-value function updated by the value function updating means.

(5) The servo control apparatus according to the present invention includes the machine learning apparatus according to any one of (1) to (4).

(6) A servo control system according to the present invention includes the machine learning apparatus and the servo control apparatus according to any one of (1) to (4).

(7) A machine learning method according to the present invention is a machine learning method for a machine learning apparatus to perform reinforcement learning to a servo control apparatus with respect to at least one of a backlash compensation parameter in a backlash compensating means and a backlash acceleration compensation parameter in a backlash acceleration compensating means. The servo control apparatus includes the backlash compensating means for creating a backlash compensation value with respect to a position command or a position deviation and the backlash acceleration compensating means for creating a backlash acceleration compensation value with respect to a speed command. The machine learning method includes the steps of an action information outputting step of outputting action information including adjustment information on at least one of the backlash compensation parameter and the backlash acceleration compensation parameter to at least one of the backlash compensating means and the backlash acceleration compensating means, a state information acquiring step of acquiring, from the servo control apparatus, state information including at least either one of the backlash compensation parameter and the backlash acceleration compensation parameter, and position deviation obtained from the position command and a fed-back position, at a time of making the servo control apparatus execute a predetermined machining program on the basis of the action information, a reward outputting step of outputting a reward value in the reinforcement learning on the basis of the position deviation included in the state information, and a value function updating step of updating an action-value function on the basis of the reward value, the state information, and the action information.

The present invention enables to perform reinforcement learning enabling to prevent complicated adjustment of coefficients of backlash compensation and backlash acceleration compensation, in the case where the backlash compensation and the backlash acceleration compensation are performed for complicated shapes in a servo control apparatus using the backlash compensation and the backlash acceleration compensation, so as to reduce the position deviation and the speed deviation and improve followability to the position command.

DETAILED DESCRIPTION OF THE INVENTION

Some embodiments of the present invention will be described in detail below with reference to the drawings.

First Embodiment

Figure 1:
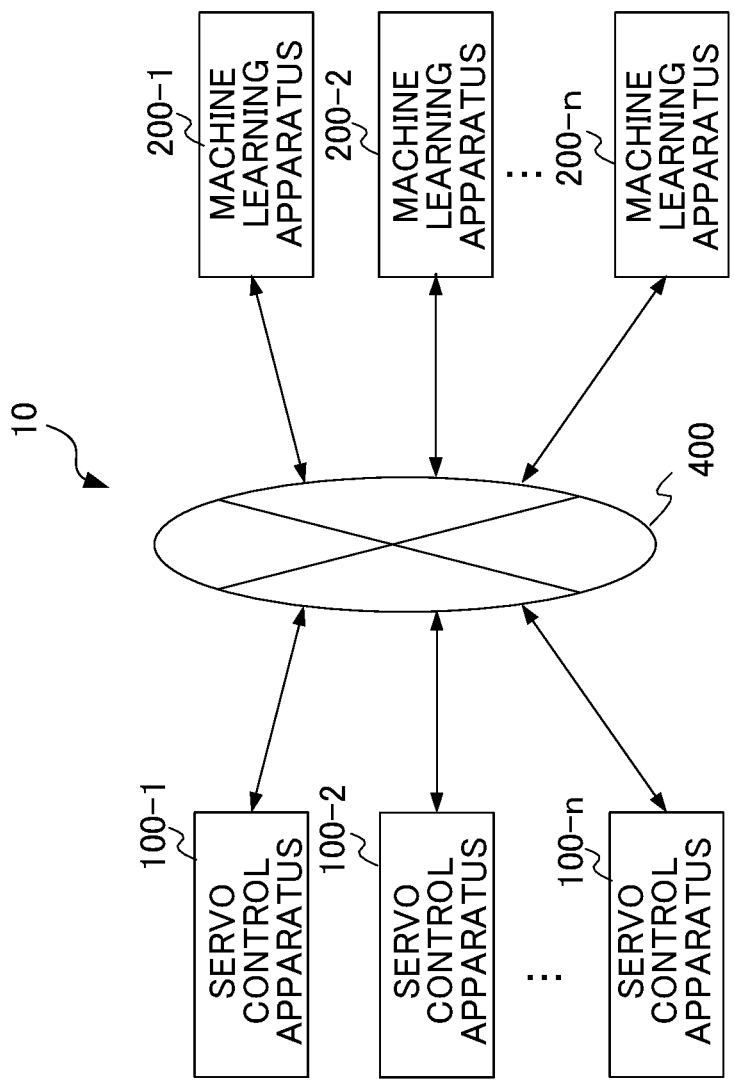
FIG. 1 is a block diagram illustrating a servo control system according to a first embodiment of the present invention.

FIG. 1 is a block diagram illustrating a servo control system according to the first embodiment of the present invention. As shown in FIG. 1, a servo control system 10 includes, for example, n units of servo control apparatuses 100-1 to 100-n, n units of machine learning apparatuses 200-1 to 200-n, and a network 400. It is noted that the number n is an arbitrary natural number.

The servo control apparatus 100-1 and the machine learning apparatus 200-1 herein are communicably connected in a one-to-one pair. The servo control apparatuses 100-2 to 100-n and the machine learning apparatuses 200-2 to 200-n are also connected in the same way as the servo control apparatus 100-1 and the machine learning apparatus 200-1. In FIG. 1, the n-pairs of the servo control apparatuses 100-1 to 100-n and the machine learning apparatuses 200-1 to 200-n are connected via the network 400. Alternatively, in each of the n-pairs of the servo control apparatuses 100-1 to 100-n and the machine learning apparatuses 200-1 to 200-n, each servo control apparatus and each machine learning apparatus in a pair may be directly connected to each other via a connection interface. The n-pairs of the servo control apparatuses 100-1 to 100-n and the machine learning apparatuses 200-1 to 200-n may be disposed, for example, in the same factory, or may be respectively disposed in different factories. It is noted that the network 400 is, for example, a LAN (Local Area Network) built into a factory, the Internet, a public telephone network, or a combination of these. The network 400 is not particularly limited to a specific communication system, a wired connection or a wireless connection, or the like.

Figure 2:
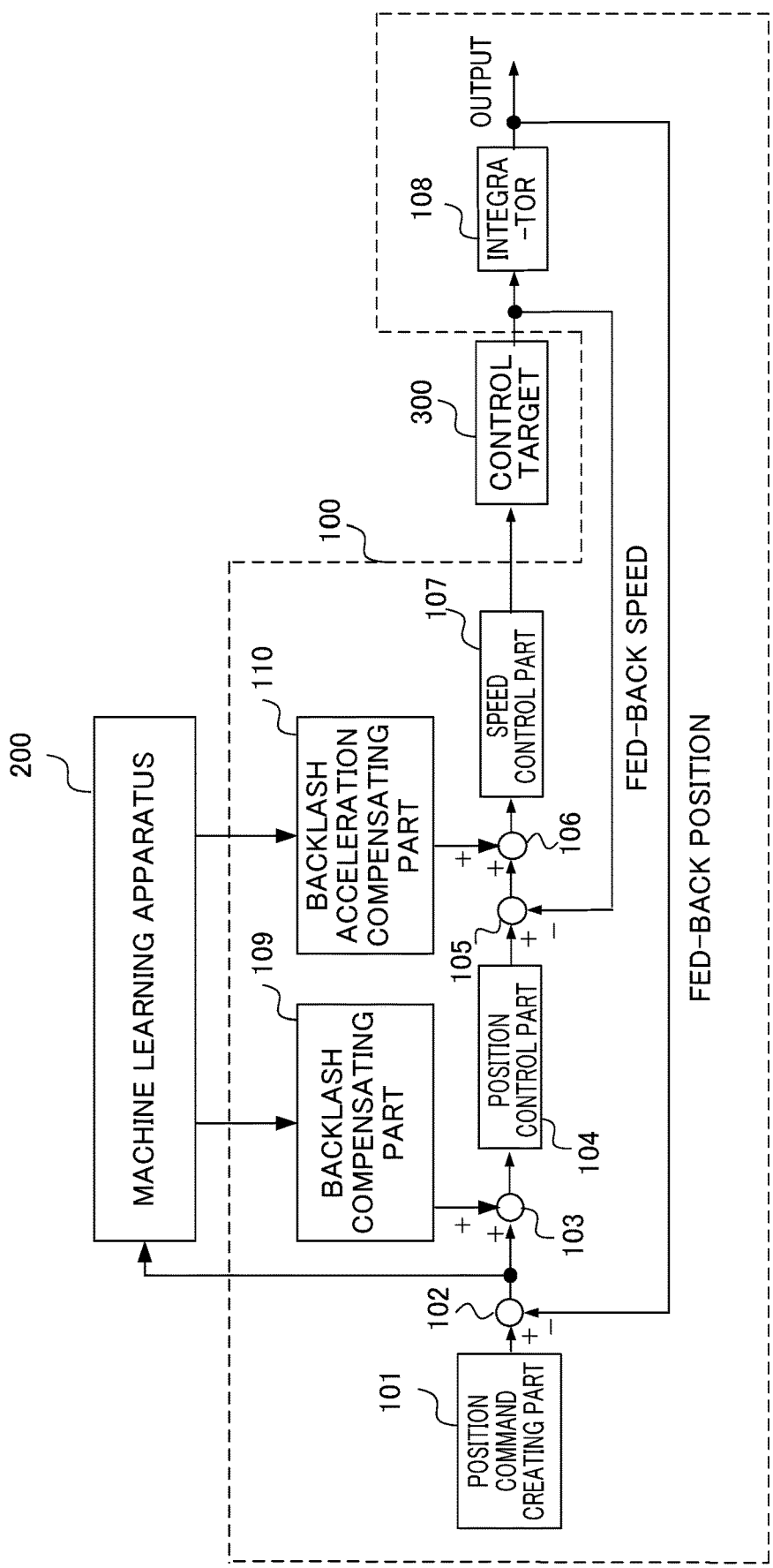
FIG. 2 is a block diagram illustrating a configuration example in which a servo control apparatus 100 and a machine learning apparatus 200 are connected via a network.

FIG. 2 is a block diagram illustrating a pair of the servo control apparatus and the machine learning apparatus in the servo control system according to the first embodiment of the present invention, and a control target. For example, the servo control apparatus 100 and the machine learning apparatus 200 in FIG. 2 respectively correspond to the servo control apparatus 100-1 and the machine learning apparatus 200-1 shown in FIG. 1. The control target 300 is, for example, a servo motor, or a machine tool, a robot, an industrial machine, or the like including a servo motor. The servo control apparatus 100 may be provided as a part of a machine tool, a robot, an industrial machine, or the like.

First, the servo control apparatus 100 is described. The servo control apparatus 100 includes a position command creating part 101, a subtracter 102, an adder 103, a position control part 104, a subtracter 105, an adder 106, a speed control part 107, an integrator 108, a backlash compensating part 109, and a backlash acceleration compensating part 110.

The position command creating part 101 creates a position command value and outputs the created position command value to the subtracter 102. The subtracter 102 obtains a difference between the position command value and a fed-back detection position and outputs the difference as a position deviation value to the adder 103. It is noted that, during the machine learning, the position deviation value is also transmitted to the machine learning apparatus 200 described below.

The position command creating part 101 creates the position command value on the basis of an arbitrary machining program for operating the control target 300. For example, in the case where the control target 300 is a machine tool including a servo motor, and moves a table on which a workpiece (work) is mounted, for machining in an X-axis direction and a Y-axis direction, a servo control apparatus shown in FIG. 2 is disposed for each of the X-axis direction and the Y-axis direction. In the case where the table is moved in three axial directions or more, a servo control apparatus is disposed for each of the axial directions. The position command creating part 101 creates a position command value by setting a feed rate so as to form the machining shape specified by the machining program.

The backlash compensating part 109 outputs to the adder 103 the backlash compensation value created on the basis of a backlash compensation parameter.

The adder 103 adds the backlash compensation value input by the backlash compensating part 109 to the position deviation input by the subtracter 102, and outputs to the position control part 104 the position deviation obtained by the adding of the backlash compensation value. It is noted that the adder 103 may add the backlash compensation value to the position command instead of the position deviation.

The position control part 104 outputs to the subtracter 105 a value obtained by multiplying the position deviation by a position gain Kp as a speed command value. The subtracter 105 obtains a difference between the speed command value and a fed-back speed detection value and outputs the difference as a speed deviation to the adder 106.

The backlash acceleration compensating part 110 outputs to the adder 106 the backlash acceleration compensation value created on the basis of a backlash acceleration compensation parameter.

The adder 106 adds the backlash acceleration compensation value input by the backlash acceleration compensating part 110 to the speed deviation input by the subtracter 105 and outputs to the speed control part 107 the speed deviation obtained by the adding of the backlash acceleration compensation value.

The speed control part 107 adds the integral value obtained by multiplying the speed deviation by an integral gain K1v for integration and the value obtained by multiplying the speed deviation by a proportional gain K2v and outputs the resultant value as a torque command value to the control target 300.

The control target 300 outputs the speed detection value, and the speed detection value is input to the subtracter 105 as a fed-back speed. The speed detection value is integrated by the integrator 108, and the resultant value is set as a position detection value. The position detection value is input to the subtracter 102 as a fed-back position. The servo control apparatus 100 is configured as described above.

Figure 3:
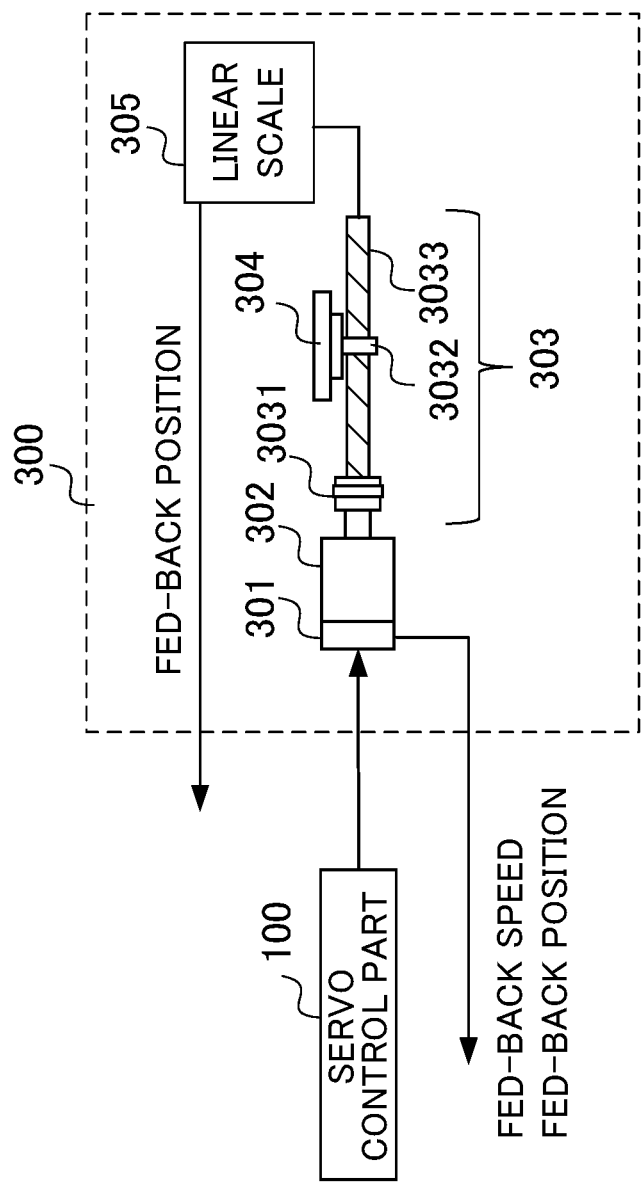
FIG. 3 is a block diagram illustrating one example of a control target 300.

The description below is about the control target 300 to be controlled by the servo control apparatus 100. FIG. 3 is a block diagram illustrating a machine tool including a servo motor, serving as one example of the control target 300. The servo control apparatus 100 moves a table 304 via a coupling mechanism 303 by a servo motor 302, for machining a workpiece (work) mounted on the table 304. The coupling mechanism 303 has a coupling 3031 connected to the servo motor 302 and a ball screw 3033 fixed to the coupling 3031, and a nut 3032 is screwed to the ball screw 3033. Upon the rotational driving of the servo motor 302, the nut 3032 screwed to the ball screw 3033 moves in the shaft direction of the ball screw 3033.

The rotational angle position of the servo motor 302 is detected by a rotary type encoder 301 which is associated with the servo motor 302 and serves as a position detecting part. The detected signal is used as the fed-back speed. The detected signal after integration is used as the fed-back position. It is noted that a linear scale 305 may be attached to the end of the ball screw 3033 to detect a moving distance of the ball screw 3033, and an output of the linear scale 305 may be used as the fed-back position. Alternatively, the fed-back position may be generated by use of an acceleration sensor.

The machine learning apparatus 200 executes a predetermined machining program which has been prepared in advance (hereinafter, also referred to as a "machining program during learning"), thereby performing reinforcement learning with respect to the backlash compensation parameter to be used at the time when the backlash compensating part 109 creates the backlash compensation value, and the backlash acceleration compensation parameter to be used at the time when the backlash acceleration compensating part 110 creates the backlash acceleration compensation value. The machining shape specified by a machining program during learning is, for example, a circle, a square, a square with quarter arc, or the like.

Figure 4A:
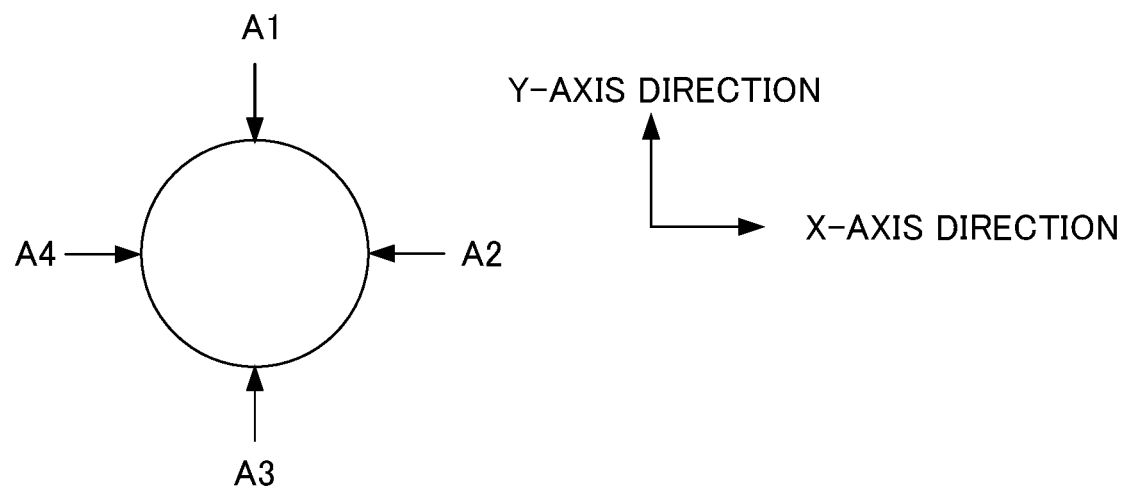
FIG. 4A is a diagram for explaining the operation of a servo motor in the case where a machining shape is a circle.
Figure 4B:
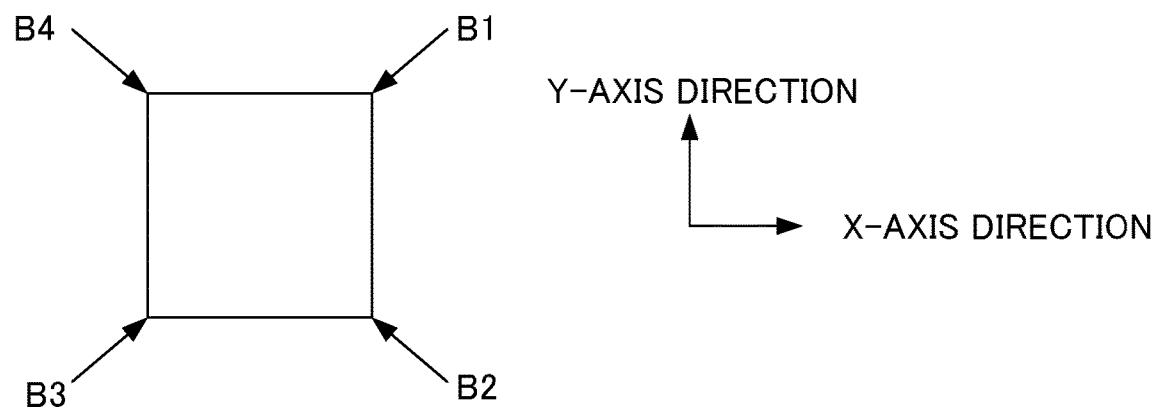
FIG. 4B is a diagram for explaining the operation of the servo motor in the case where the machining shape is a square.
Figure 4C:
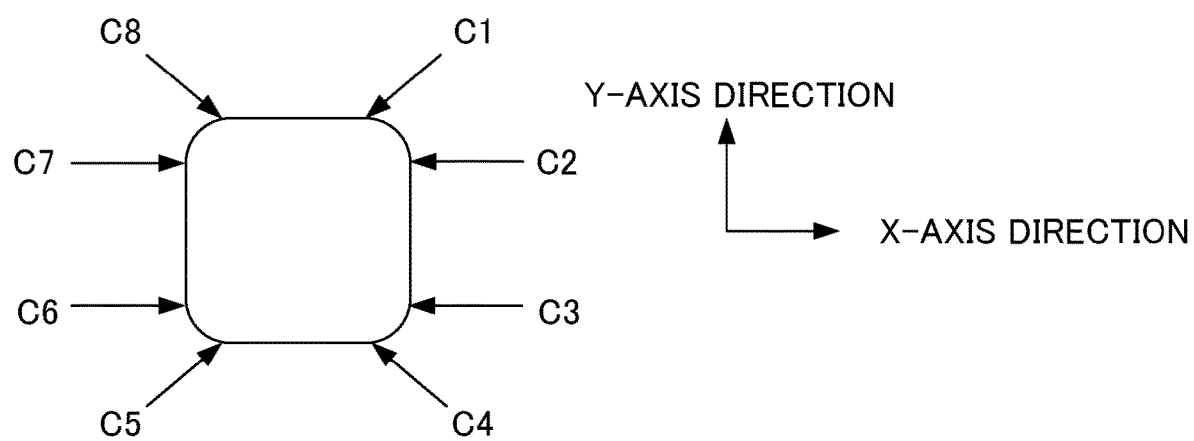
FIG. 4C is a diagram for explaining the operation of the servo motor in the case where the machining shape is a square with quarter arc.

The machining program during learning is described. FIG. 4A is a diagram for explaining the operation of the servo motor in the case where the machining shape specified by the machining program during learning is a circle. FIG. 4B is a diagram for explaining the operation of the servo motor in the case where the machining shape specified by the machining program during learning is a square. FIG. 4C is a diagram for explaining the operation of the servo motor in the case where the machining shape specified by the machining program during learning is a square with quarter arc. In each of FIG. 4A to FIG. 4C, the table moves such that a workpiece (work) is machined clockwise.

As shown in FIG. 4A in the case where the machining shape is a circle, at a position A1 and a position A3, the servo motor for moving the table in the Y-axis direction is reversed in the rotational direction, whereby the table moves so as to be linearly reversed in the Y-axis direction. At a position A2 and a position A4, the servo motor for moving the table in the X-axis direction is reversed in the rotational direction, whereby the table moves so as to be linearly reversed in the X-axis direction.

As shown in FIG. 4B in the case where the machining shape is a square, at a position B1, the servo motor for moving the table in the Y-axis direction shifts from stop operation to rotation operation, and the servo motor for moving the table in the X-axis direction shifts from rotation operation to stop operation, whereby the table shifts from linear operation in the X-axis direction to linear operation in the Y-axis direction. Similarly, at a position B2, the servo motor for moving the table in the X-axis direction shifts from stop operation to rotation operation, and the servo motor for moving the table in the Y-axis direction shifts from rotation operation to stop operation, whereby the table shifts from linear operation in the Y-axis direction to linear operation in the X-axis direction. At a position B3, the servo motor for moving the table in the Y-axis direction shifts from stop operation to rotation operation, and the servo motor for moving the table in the X-axis direction shifts from rotation operation to stop operation, whereby the table shifts from linear operation in the X-axis direction to linear operation in the Y-axis direction. At a position B4, the servo motor for moving the table in the X-axis direction shifts from stop operation to rotation operation, and the servo motor for moving the table in the Y-axis direction shifts from rotation operation to stop operation, whereby the table shifts from linear operation in the Y-axis direction to linear operation in the X-axis direction.

As shown in FIG. 4C, in the case where the machining shape is a square with quarter arc, at a position C1, the servo motor for moving the table in the Y-axis direction shifts from stop operation to rotation operation, whereby the table shifts from linear operation in the X-axis direction to arc operation. At a position C2, the servo motor for moving the table in the X-axis direction shifts from rotation operation to stop operation, whereby the table shifts from arc operation to linear operation in the Y-axis direction. Similarly, at a position C3, the servo motor for moving the table in the X-axis direction shifts from stop operation to rotation operation, whereby the table shifts from linear operation in the Y-axis direction to arc operation. At a position C4, the servo motor for moving the table in the Y-axis direction shifts from rotation operation to stop operation, whereby the table shifts from arc operation to linear operation in the X-axis direction. At a position C5, the servo motor for moving the table in the Y-axis direction shifts from stop operation to rotation operation, whereby the table shifts from linear operation in the X-axis direction to arc operation. At a position C6, the servo motor for moving the table in the X-axis direction shifts from rotation operation to stop operation, whereby the table shifts from arc operation to linear operation in the Y-axis direction. At a position C7, the servo motor for moving the table in the X-axis direction shifts from stop operation to rotation operation, whereby the table shifts from linear operation in the Y-axis direction to arc operation. At a position C8, the servo motor for moving the table in the Y-axis direction shifts from rotation operation to stop operation, whereby the table shifts from arc operation to linear operation in the X-axis direction.

Figure 4D:
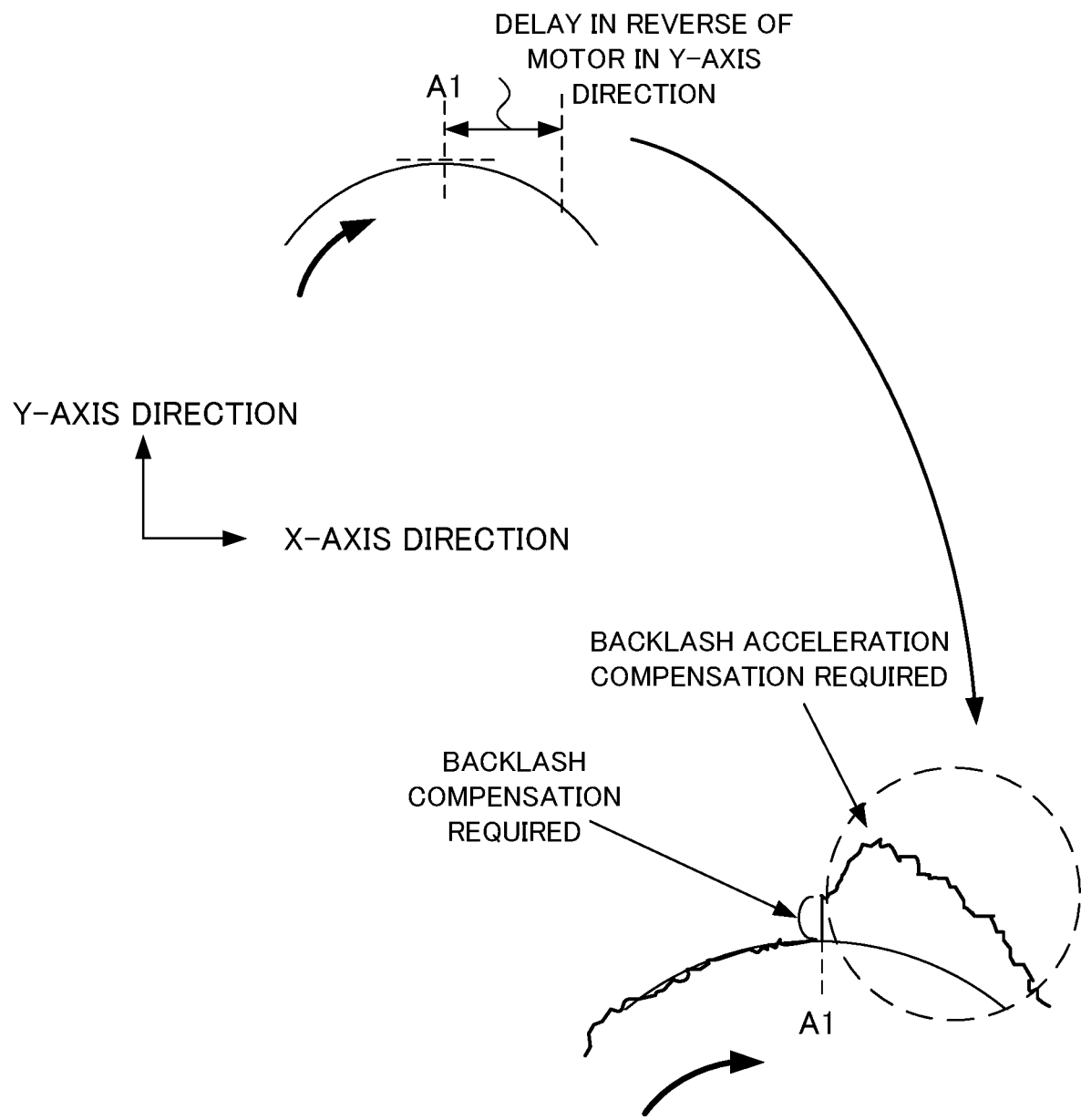
FIG. 4D is an explanatory diagram illustrating a protrusion of the case where the machining shape is a circle and the servo motor for moving a table in a Y-axis direction is reversed in a rotational direction at a position A1.

FIG. 4D is an explanatory drawing illustrating the generation of a protrusion caused by ricketiness and friction on contacting surfaces between mechanical elements when, in the case where the machining shape is a circle, the servo motor for moving the table in the Y-axis direction is reversed in the rotational direction at the position A1. As shown in FIG. 4D, when the servo motor for moving the table in the Y-axis direction is being reversed in the rotational direction at the position A1, the existence of ricketiness in the contacting surfaces between mechanical elements causes deviation of a rotation center in a locus. Moreover, the reverse is delayed due to friction, whereby an error in the locus expands in the radial direction and is observed as a protrusion in a magnified view. Backlash compensation is required for the deviation of the rotation center, and backlash acceleration compensation is required to eliminate the protrusion. As described above, coasting (operation by coasting) caused when the rotational direction is reversed or when operation is shifted from rotation state to stop state is evaluated on the basis of the machining shape specified by the machining program during learning, thereby enabling to check the influence on the position deviation.

Upon execution of the machining program during learning, the position command creating part 101 of the servo control apparatus 100 sequentially outputs the position command values so as to form the machining shape in a circle, a square, or a square with quarter arc. The position command creating part 101 further changes a feed rate according to each of the machining shapes of a circle, a square, and a square with quarter arc, so that the influence of various feed rates is learned. The feed rate may be changed during moving along a figure of such a machining shape, for example, after a corner is machined when the table is being moved along a square of the machining shape.

<Reinforcement Learning>

Prior to the description of each functional block included in the machine learning apparatus 200, the basic mechanism of reinforcement learning is explained. An agent (corresponding to the machine learning apparatus 200 in the present embodiment) observes the state of an environment and selects a certain action, whereby the environment changes on the basis of the action. As the environment changes, some kind of reward is given, and the agent learns a better selection of an action (decision making). Supervised learning provides completely correct answers, whereas reinforcement learning provides rewards of a fragmentary value based on a change in a part of the environment, in many cases. Therefore, the agent learns to select an action so as to maximize the total future reward.

As described above, in the reinforcement learning, appropriate actions are learned through learning of actions on the basis of the mutual interaction given by the actions in the environment, that is, through a learning method to maximize the future reward. This means that, in the present embodiment, action information for reducing position deviation is selected; that is, an action for influencing the future is acquired.

As the reinforcement learning, an arbitrary learning method is available. The following description is about an example case of Q-learning, which is a method to learn a value Q(s, a) for selecting an action a under a state s of a certain environment. The object of the Q-learning is to select, under the certain state s, the action a having the highest value Q(s, a) as the optimal action among the possible actions a.

However, at the time of initially starting the Q-learning, none of the correct values of the value Q(s, a) is known with respect to the combination of the state s and the action a. Therefore, the agent selects various actions a under the certain state s and selects a better action on the basis of the reward to be given to the action a at that time, thereby learning the correct value Q(s, a).

In order to maximize the total future reward, the object is set to finally satisfy the following equation: $Q(s, a)=E[\Sigma(\gamma^t) r_t]$. In the above equation, $E[\ ]$ denotes an expected value; t denotes time; $\gamma$ denotes a parameter called a discount factor described below; $r_t$ denotes a reward at the time t; and $\Sigma$ denotes a sum at the time t. The expected value in the equation corresponds to the expected value of the case where a state changes according to the optimal action. Since the optimal action is unknown in the process of the Q-learning, the reinforcement learning is being performed while the optimal action is being searched through performing various actions. An update formula of such a value Q(s, a) is expressed by, for example, a formula 1 (hereinafter, referred to as Formula 1) as below.

$$Q(s_{t+1}, a_{t+1}) \leftarrow Q(s_t, a_t) + \alpha\left(r_{t+1} + \gamma \max_a Q(s_{t+1}, a) - Q(s_t, a_t)\right)$$ [Formula 1]

In the formula 1 above, $s_t$ denotes the state of the environment at the time t and $a_t$ denotes the action at the time t. The action $a_t$ changes the state to $s_{t+1}$. In the formula 1, $r_{t+1}$ denotes the reward obtained according to the change of the state. The term with "max" is obtained by multiplying by $\gamma$ the value Q of the case where the action a having the highest value Q known at the time is selected under the state $s_{t+1}$. Herein, $\gamma$, which is called a discount factor, has a parameter of $0<\gamma \leq 1$. Moreover, $\alpha$, which is a learning rate, is set in the range of $0<\alpha \leq 1$.

The formula 1 described above denotes the method of updating the value $Q(s_t, a_t)$ of the action $a_t$ in the state $s_t$ on the basis of the obtained reward $r_{t+1}$ as a result of the action $a_t$ performed. The update formula indicates that, when the value $\max_a Q(s_{t+1}, a)$ of the best action in the next state $s_{t+1}$ according to the action $a_t$ is larger than the value $Q(s_t, a_t)$ of the action $a_t$ in the state $s_t$, the value $Q(s_t, a_t)$ is increased, while when the value $\max_a Q(s_{t+1}, a)$ is smaller than the value $Q(s_t, a_t)$, the value $Q(s_t, a_t)$ is decreased. That is, the value of a certain action in a certain state is brought closer to the value of the best action in the next state. Although such difference depends on the discount factor $\gamma$ and the reward $r_{t+1}$, basically, in this system, the value of the best action in a certain state is propagated to the value of the action in the preceding state leading to the certain state.

As a method of Q-learning, learning can be performed after a table is prepared with respect to Q(s, a) for all of the state-action pairs (s, a). Since the number of states is too large to obtain the values of Q(s, a) for all of the state-action pairs, it may take much time for the Q-learning to converge, in some cases.

Therefore, a well-known technique called DQN (Deep Q-Network) may be used. Specifically, in an action-value function Q configured with an appropriate neural network, a parameter of the neural network may be adjusted, and a value function Q may be approximated by use of the appropriate neural network, thereby calculating the value Q(s, a). The use of DQN enables to shorten the time required for the Q-learning to converge. It is noted that DQN is disclosed in detail in the following non-patent document, as an example.

Non-Patent Document

"Human-level control through deep reinforcement learning," written by Volodymyr Mnih1 [online], [Searched on Jan. 17, 2017], on the following website: <URL: http://files.davidqiu.com/research/nature14236.pdf>

The machine learning apparatus 200 performs the Q-learning described above. It is noted that, in the present embodiment, the reinforcement learning (also referred to as "first reinforcement learning") is performed first with respect to the backlash compensation parameter used for calculation at the time when the backlash compensating part 109 creates the backlash compensation value, instead of simultaneous learning with respect to both of the backlash compensation parameter and the backlash acceleration compensation parameter used at the time of when the backlash acceleration compensating part 110 creates the backlash acceleration compensation value. After the optimal backlash compensation parameter is calculated by the first reinforcement learning and the calculated backlash compensation parameter is set in the backlash compensating part 109, the reinforcement learning (also referred to as "second reinforcement learning") is performed with respect to the backlash acceleration compensation parameter used at the time when the backlash acceleration compensating part 110 creates the backlash acceleration compensation value. The method above enables efficient reinforcement learning.

<First Reinforcement Learning>

First, the first reinforcement learning is described. In the first reinforcement learning, the machine learning apparatus 200 learns the backlash compensation parameter used for calculation at the time when the backlash compensating part 109 in the servo control apparatus 100 creates the backlash compensation value, and also the value Q for selecting as the action a the adjustment of the backlash compensation parameter in a state s, by setting as the state s the servo state including the position deviation information of the servo control apparatus 100 acquired upon execution of control based on the position command during learning. It is noted that, during the first reinforcement learning, the backlash acceleration compensation may be omitted.

In the learning for the backlash compensation, the value Q for selecting as the action a the adjustment (correction) of a backlash compensation parameter $P_0$ is learned.

On the basis of the backlash compensation parameter $P_0$, the machine learning apparatus 200 observes state information s including the backlash compensation parameter $P_0$ and the set of position deviation values obtained from the position commands and the fed-back position values of the case where the servo control apparatus 100 is made to execute the machining program during learning, and then determines the next action a (adjustment of the backlash compensation parameter $P_0$). The machine learning apparatus 200 receives a reward every time the action a is performed. For example, the machine learning apparatus 200 makes a search for the optimal action a by trial and error, so that the total future reward is maximized. This processing allows the machine learning apparatus 200 to select the optimal action a, that is, the backlash compensation parameter $P_0$ with respect to the state information s including the servo state including the position deviation information of the servo control apparatus 100 obtained by making the servo control apparatus 100 execute the machining program during learning on the basis of the backlash compensation parameter $P_0$.

In such a way, the action a is selected so that the value Q is maximized among the actions a applied to the backlash compensation parameter $P_0$ in a certain state s, on the basis of the value function Q learned by the machine learning apparatus 200, thereby enabling to perform the action a for minimizing the position deviation (that is, enabling to select the optimal backlash compensation parameter $P_0$ for the backlash compensating part 109).

That is, the action a is selected so that the value Q is maximized among the actions a applied to the backlash compensation parameter $P_0$ in the certain state s, on the basis of the value function Q learned by the machine learning apparatus 200, thereby enabling to select the action a for minimizing the position deviation acquired upon execution of the machining program during learning (that is, the backlash compensation parameter $P_0$).

Although the reinforcement learning in the present embodiment with respect to the backlash compensation parameter $P_0$ has been described, the reinforcement learning is not limited to the backlash compensation parameter $P_0$. For example, the reinforcement learning may be performed in the case where, after the servo motor is reversed in the rotational direction, no compensation is performed until the amount of movement after the reversal reaches a fixed value $L_0$, and then at the time when the amount of movement reaches the fixed value $L_0$, the backlash compensation is performed with the backlash compensation parameter $P_0$ as a compensation value. That is, the reinforcement learning may be performed with respect to $P_0$ and $L_0$ as the backlash compensation parameters. In this case, the action a is to adjust the backlash compensation parameters $P_0$ and $L_0$. The reinforcement learning may be performed in the case of executing the backlash compensation with the backlash compensation parameter in a right direction (forward direction) or the backlash compensation parameter in a left direction (reverse direction) as the compensation value and/or the amount of movement, depending on whether the rotational direction of the servo motor is the right direction (forward direction) or the left direction (reverse direction). That is, the reinforcement learning may be performed with respect to the backlash compensation parameter in the right direction (forward direction) and the backlash compensation parameter in the left direction (reverse direction).

<Functional Block of Machine Learning Apparatus 200>

Figure 5:
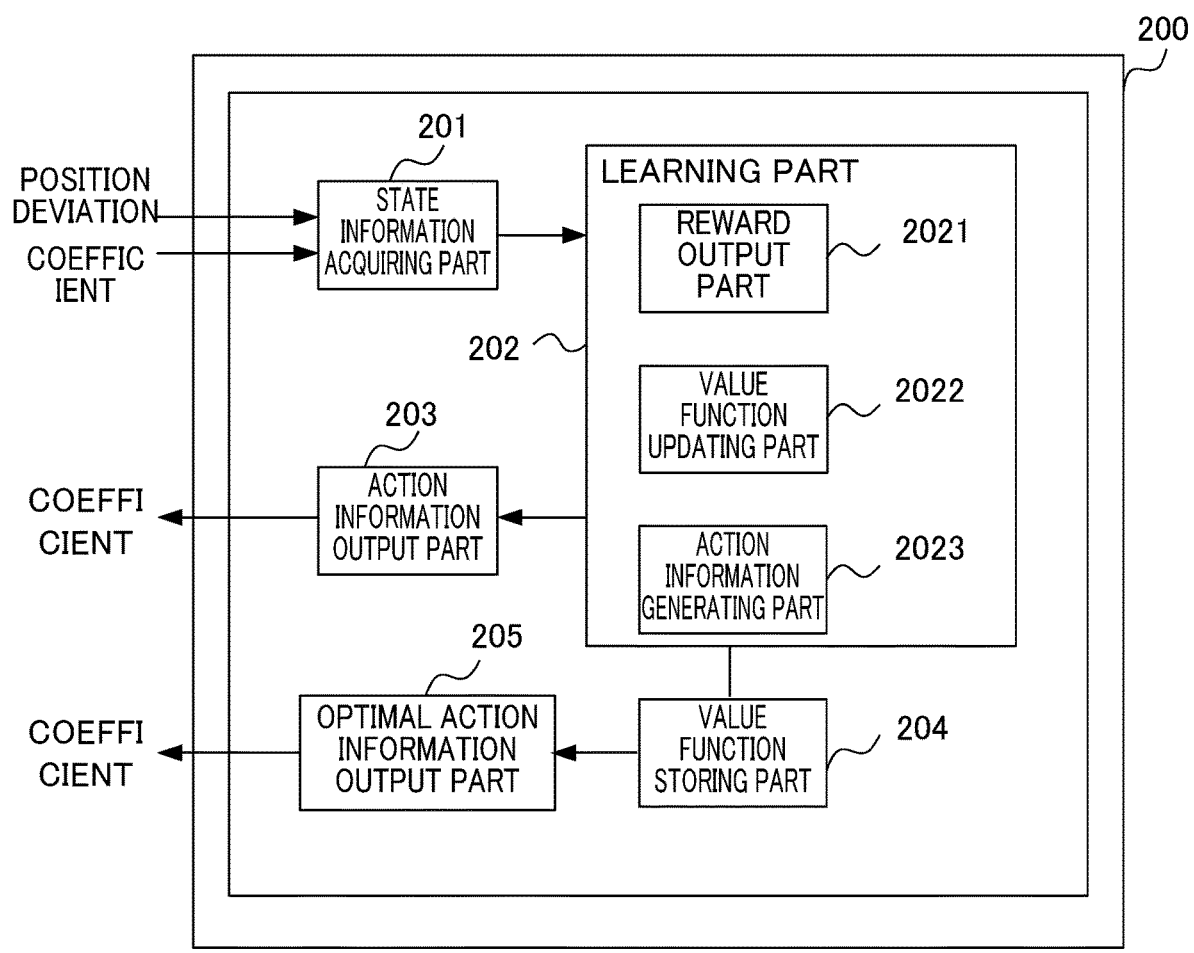
FIG. 5 is a block diagram illustrating the machine learning apparatus 200 according to the first embodiment.

FIG. 5 is a block diagram illustrating the machine learning apparatus 200 of the case of performing the first reinforcement learning. As shown in FIG. 5, the machine learning apparatus 200 includes a state information acquiring part 201, a learning part 202, an action information output part 203, a value function storing part 204, and the optimal action information output part 205, to perform the first reinforcement learning described above. The learning part 202 includes a reward output part 2021, a value function updating part 2022, and an action information generating part 2023.

It is noted that the state information acquiring part 201, the learning part 202, the action information output part 203, the value function storing part 204, the optimal action information output part 205, the reward output part 2021, the value function updating part 2022, and the action information generating part 2023 operate for the reinforcement learning with respect to the backlash compensation parameter $P_0$ described above.

On the basis of the backlash compensation parameter $P_0$ in the servo control apparatus 100, the state information acquiring part 201 acquires, from the servo control apparatus 100, a state s including a command including the position deviation information of the servo control apparatus 100 acquired upon execution of the machining program during learning and the servo state such as feedback. The state information s corresponds to an environmental state s in the Q-learning. The state information acquiring part 201 outputs the acquired state information s to the learning part 202. It is noted that a user creates the backlash compensation parameter $P_0$ at the time of initially starting the Q-learning in advance. In the present embodiment, such a default value of the backlash compensation parameter $P_0$ created by a user is adjusted to the optimal value by the reinforcement learning.

The learning part 202 is the unit for learning the value Q(s, a) of the case where a certain action a is selected under a certain environmental state s. Specifically, the learning part 202 includes the reward output part 2021, the value function updating part 2022, and the action information generating part 2023.

The reward output part 2021 is the unit for calculating a reward of the case where an action a is selected under a certain state s. Herein, PD(s) denotes the set of the position deviation values (position deviation set) corresponding to state variables in the state s, and PD(s') denotes the position deviation set corresponding to state variables in the state information s' changed from the state s according to the action information a (correction of the backlash compensation parameter $P_0$). The value of the position deviation in the state s is set to a value obtained through calculation based on a preset evaluation function f(PD(s)). For example, the following functions are available as the evaluation function f:

a function for calculating an integrated value of an absolute value of position deviation, expressed by $$\int |e| dt;$$

a function for calculating an integrated value by weighting an absolute value of position deviation with time, expressed by $$\int t|e| dt;$$

a function for calculating an integrated value of 2n (n is a natural number) raised to an absolute value of position deviation, expressed by $$\int e^{2n} dt \text{ (}n\text{ is a natural number); and}$$

a function for calculating a maximum value of an absolute value of position deviation, expressed by $$\text{Max}\{|e|\}.$$

The reward output part 2021 sets a negative value as a reward value in the case where the value f(PD(s')) of the position deviation of the servo control apparatus 100 operating on the basis of the backlash compensating part 109 after correction resulting from the state information s' corrected with the action information a is larger than the value f(PD(s)) of the position deviation of the servo control apparatus 100 operating on the basis of the backlash compensating part 109 before correction resulting from the state information s before correction with the action information a.

On the other hand, the reward output part 2021 sets a positive value as a reward value in the case where the value f(PD(s')) of the position deviation of the servo control apparatus 100 operating on the basis of the backlash compensating part 109 after correction resulting from the state information s' corrected with the action information a is smaller than the value f(PD(s)) of the position deviation of the servo control apparatus 100 operating on the basis of the backlash compensating part 109 before correction resulting from the state information s before correction with the action information a. It is noted that the reward output part 2021 sets zero as a reward value in the case where the value f(PD(s')) of the position deviation of the servo control apparatus 100 operating on the basis of the backlash compensating part 109 after correction resulting from the state information s' corrected with the action information a is equal to the value f(PD(s)) of the position deviation of the servo control apparatus 100 operating on the basis of the backlash compensating part 109 before correction resulting from the state information s before correction with the action information a.

In the case where the value f(PD(s')) of the position deviation in a state s' after execution of the action a is larger than the value f(PD(s)) of the position deviation in the preceding state s, a negative value larger in absolute value may be set according to the degree of the largeness. In other words, a negative value larger in absolute value may be set according to the degree of increase in the value of the position deviation. Conversely, in the case where the value f(PD(s')) of the position deviation of the state s' after execution of the action a is smaller than the value f(PD(s)) of the position deviation in the preceding state s, a larger positive value may be set according to the degree. In other words, a larger positive value may be set according to the degree of decrease in the value of the position deviation. The value of each coefficient may be set at random.

The value function updating part 2022 performs the Q-learning on the basis of the state s, the action a, the state s' after the action a is applied to the state s, and the reward value calculated as described above, thereby updating the action-value function Q stored by the value function storing part 204. The action-value function Q may be updated by online learning, batch learning, or mini-batch learning. Online learning is a learning method in which the action-value function Q is updated immediately every time the state s is shifted to a new state s' due to application of a certain action a to the current state s. Batch learning is a learning method in which data for learning is collected through repetition of shifting from the state s to the new state s' due to application of a certain action a to the current state s, whereby the action-value function Q is updated by use of all of the collected data for learning. Mini-batch learning is a learning method corresponding to an intermediate method between the online learning and the batch learning, in which the action-value function Q is updated every time data for learning is accumulated somewhat.

The action information generating part 2023 selects the action a for the process of the Q-learning with respect to the current state s. The action information generating part 2023 generates the action information a so that the action (corresponding to the action a in the Q-learning) of correcting the backlash compensation parameter $P_0$ of the servo control apparatus 100 is performed in the process of the Q-learning, and outputs the generated action information a to the action information output part 203. More specifically, for example, the action information generating part 2023 operates so that the backlash compensation parameter $P_0$ in the backlash compensating part 109 is increased or decreased in an incremental manner (for example, approx. 0.01).

Then, in the case where the state is shifted to the state s' with the backlash compensation parameter $P_0$ increased or decreased, and then a positive reward (a reward having a positive value) is returned, the action information generating part 2023 may take a measure to select the action a' so that the value of the position deviation becomes smaller, such as increasing or decreasing the backlash compensation parameter $P_0$ in an incremental manner as in the previous action, as the next action a'.

Conversely, in the case where a negative reward (a reward having a negative value) is returned, the action information generating part 2023 may take a measure to select the action a' so that the value of the position deviation becomes smaller than the previous value, such as decreasing or increasing, reversely to the previous action, the backlash compensation parameter $P_0$ in the backlash compensating part 109 in an incremental manner, as the next action a'.

The action information generating part 2023 may take a measure to select the action a' by a well-known method, such as a greedy method of selecting the action a' having the highest value Q(s, a) among the values of the currently estimated actions a, or a ε greedy method of selecting the action a' at random with a certain small probability ε, and selecting the action a' having the highest value Q(s, a) for others.

The action information output part 203 is a unit for transmitting the action information a output by the learning part 202 to the servo control apparatus 100. As described above, the servo control apparatus 100 adjusts the current state s, that is, the currently-set backlash compensation parameter $P_0$, on the basis of the action information, thereby shifting to the next state s' (that is, the corrected backlash compensation parameter $P_0$).

The value function storing part 204 is a storage device for storing the action-value function Q. For example, the action-value function Q may be stored as a table (hereinafter, referred to as an action-value table) for each state s and each action a. The action-value function Q stored in the value function storing part 204 is updated by the value function updating part 2022. The action-value function Q stored in the value function storing part 204 may be shared by other machine learning apparatuses 200. In the case where the action-value function Q is shared by a plurality of machine learning apparatuses 200, the reinforcement learning is able to be performed in a distributed manner among the respective machine learning apparatuses 200, thereby enabling to improve the efficiency of the reinforcement learning.

The optimal action information output part 205 generates the action information a (hereinafter, referred to as "optimal action information") for making the backlash compensating part 109 perform an action so that the value Q(s, a) is maximized, on the basis of the action-value function Q that was updated upon performance of the Q-learning by the value function updating part 2022. More specifically, the optimal action information output part 205 acquires the action-value function Q stored by the value function storing part 204. The action-value function Q has been updated upon performance of the Q-learning by the value function updating part 2022. The optimal action information output part 205 generates the action information on the basis of the action-value function Q, and outputs the generated action information to the servo control apparatus 100 (backlash compensating part 109). The optimal action information includes information for correcting a coefficient $P_0$ in the backlash compensating part 109, as in the action information output by the action information output part 203 in the process of the Q-learning.

In the servo control apparatus 100, the corrected backlash compensation parameter $P_0$ is set in the backlash compensating part 109 on the basis of the action information, whereby the servo control apparatus 100 is capable of performing an action so as to decrease the value of the position deviation. As described above, use of the machine learning apparatus 200 according to the present invention facilitates the optimization of the backlash compensation parameter $P_0$ set in the backlash compensating part 109 of the servo control apparatus 100.

<Second Reinforcement Learning>

The description below is about the case where the reinforcement learning (second reinforcement learning) is performed after the first reinforcement learning, with respect to the backlash acceleration compensation parameter in the backlash acceleration compensating part 110. As described above, the second reinforcement learning is performed after the optimal backlash compensation parameter calculated in the first reinforcement learning is set in the backlash compensating part 109.

Figure 6:
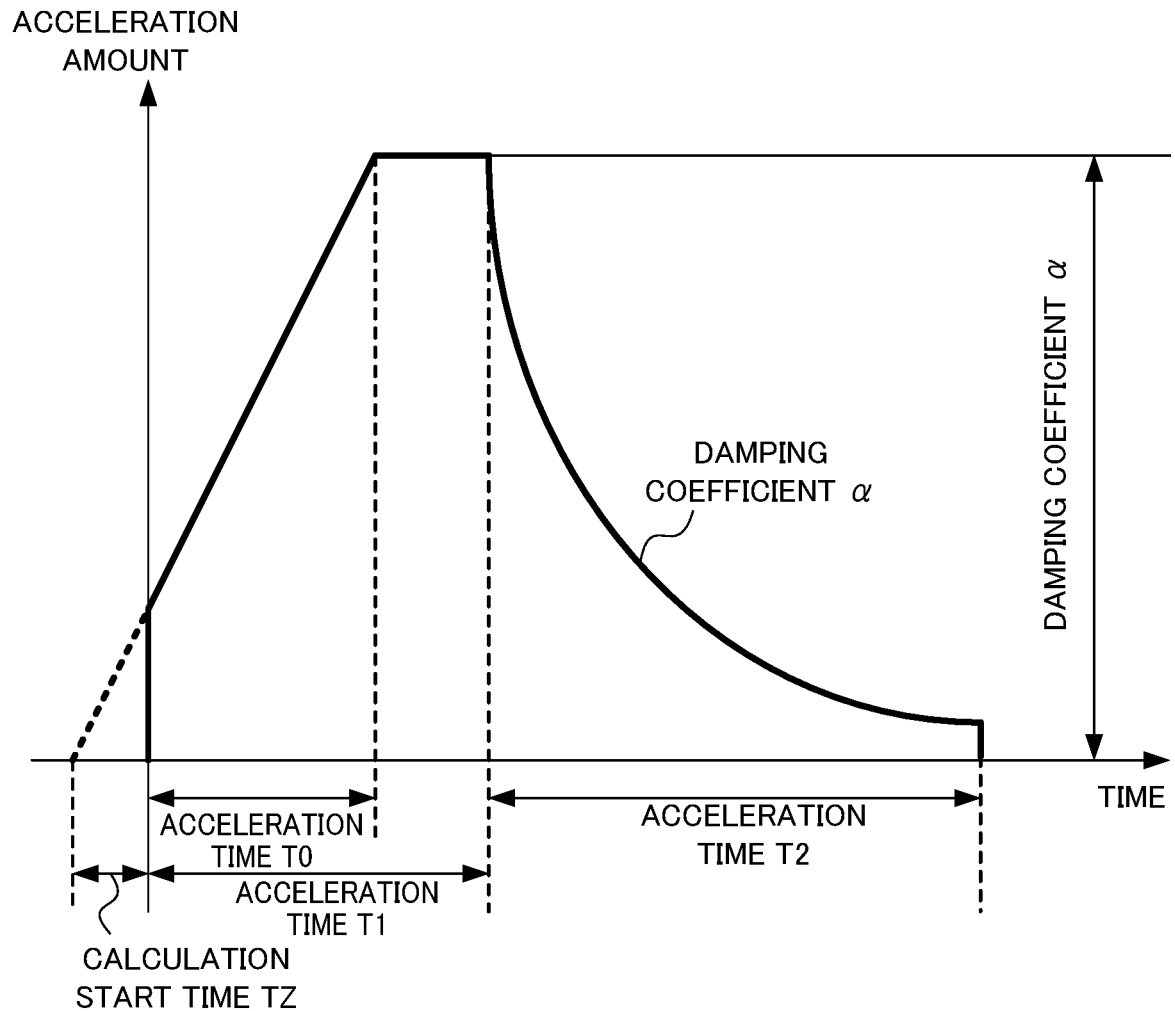
FIG. 6 is a diagram illustrating an outline of backlash acceleration compensation based on a trapezoidal acceleration system.

In the second reinforcement learning with respect to the backlash acceleration compensation parameter, compensation based on trapezoidal acceleration is available, as an example. The compensation based on trapezoidal acceleration means a method of performing compensation "for a while" based on a shape of a trapezoid as shown in FIG. 6 starting at the time when or immediately before the sign of a speed command of each axis is inverted. With the compensation based on trapezoidal acceleration shown in FIG. 6, an acceleration amount V0, a calculation start time TZ, an acceleration time T0, an acceleration time T1, and a damping coefficient α are respectively defined by the expressions (1) to (6) according to a square root of an acceleration x: $\sqrt{|x|}$ just after the inversion of the sign of the speed command. In the following expressions, $a_i$, $b_i$, and $c_i$ ($1 \leq i \leq 5$) denotes parameters for the backlash acceleration compensation. It is noted that acceleration time T2 denotes a constant parameter independent of the square root of the acceleration x: $\sqrt{|x|}$.

$V0 = a_1\sqrt{|x|} \cdot H_{1/2}(b_1-\sqrt{|x|}) + a_1 \cdot b_1 \cdot H_{1/2}(\sqrt{|x|}-b_1) + c_1$  (Expression 1)

$TZ = a_2\sqrt{|x|} \cdot H_{1/2}(b_2-\sqrt{|x|}) + a_2 \cdot b_2 \cdot H_{1/2}(\sqrt{|x|}-b_2) + c_2$  (Expression 2)

$T0 = a_3\sqrt{|x|} \cdot H_{1/2}(b_3-\sqrt{|x|}) + a_3 \cdot b_3 \cdot H_{1/2}(\sqrt{|x|}-b_3) + c_3$  (Expression 3)

$T1 = a_4\sqrt{|x|} \cdot H_{1/2}(b_4-\sqrt{|x|}) + a_4 \cdot b_4 \cdot H_{1/2}(\sqrt{|x|}-b_4) + c_4$  (Expression 4)

$\alpha = a_5\sqrt{|x|} \cdot H_{1/2}(b_5-\sqrt{|x|}) + a_5 \cdot b_5 \cdot H_{1/2}(\sqrt{|x|}-b_5) + c_5$  (Expression 5)

Herein, $H_{1/2}(x)$ is a Heaviside step function taking the following values.

$H_{1/2}(x) = 0 \quad (x<0)$ $H_{1/2}(0) = \frac{1}{2}$ $H_{1/2}(x) = 1 \quad (x>0)$  (Expression 6)

Figure 7A:
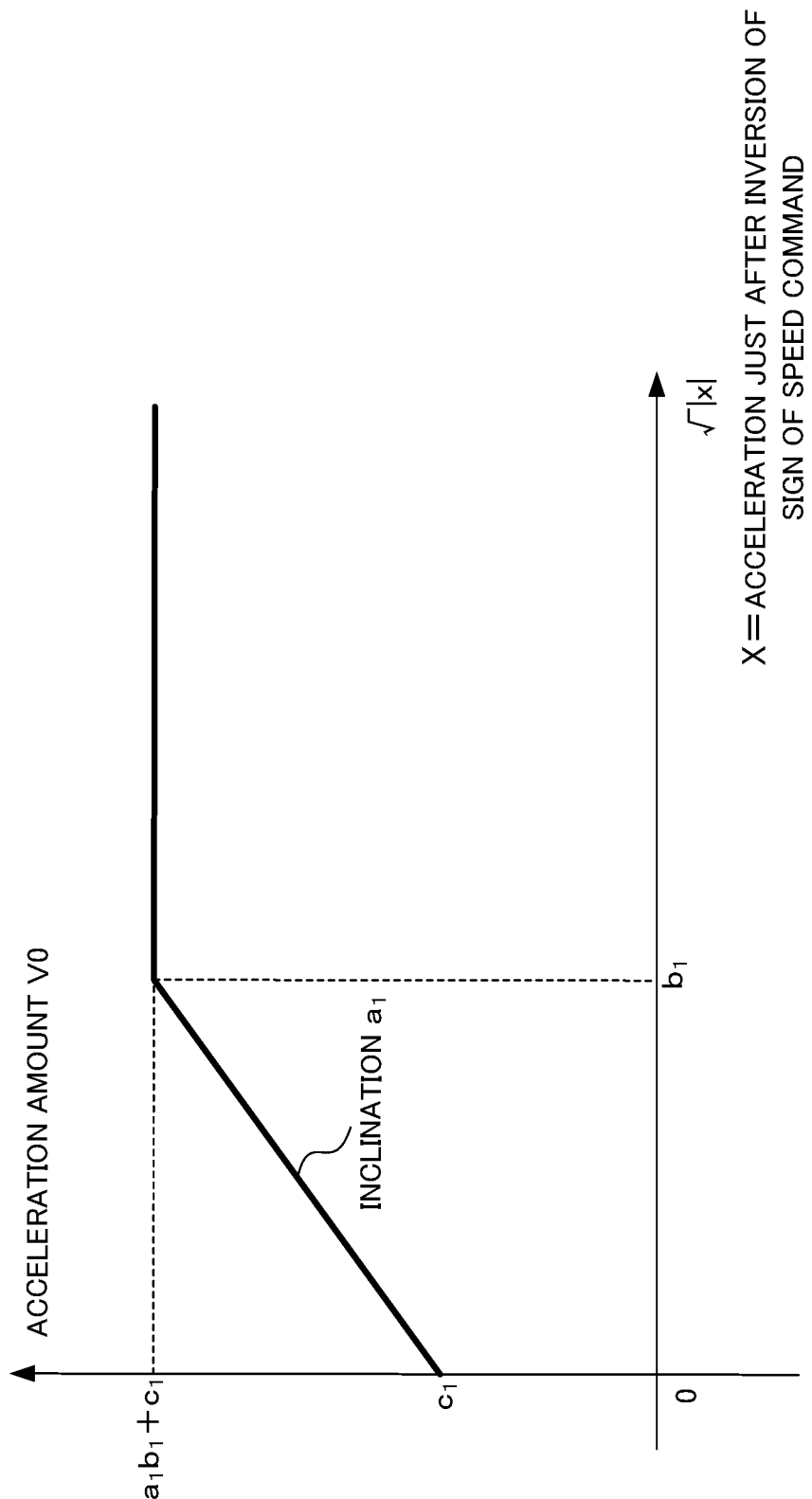
FIG. 7A is a diagram illustrating the relation between the magnitude of an acceleration amount V0 and a square root of acceleration in the backlash acceleration compensation.

Specifically, taking an acceleration amount V0 as an example, as shown in the graph of FIG. 7A, an acceleration amount V0 is a function of a square root of an acceleration x: $\sqrt{|x|}$. When $0 < \sqrt{|x|} < b_1$, an acceleration amount V0 is a linear function having an inclination of $a_1$ and a y-intercept of $c_1$. While when $\sqrt{|x|} \geq b_1$, an acceleration amount V0 is a constant value: $a_1 \cdot b_1 + c_1$.

Figure 7B:
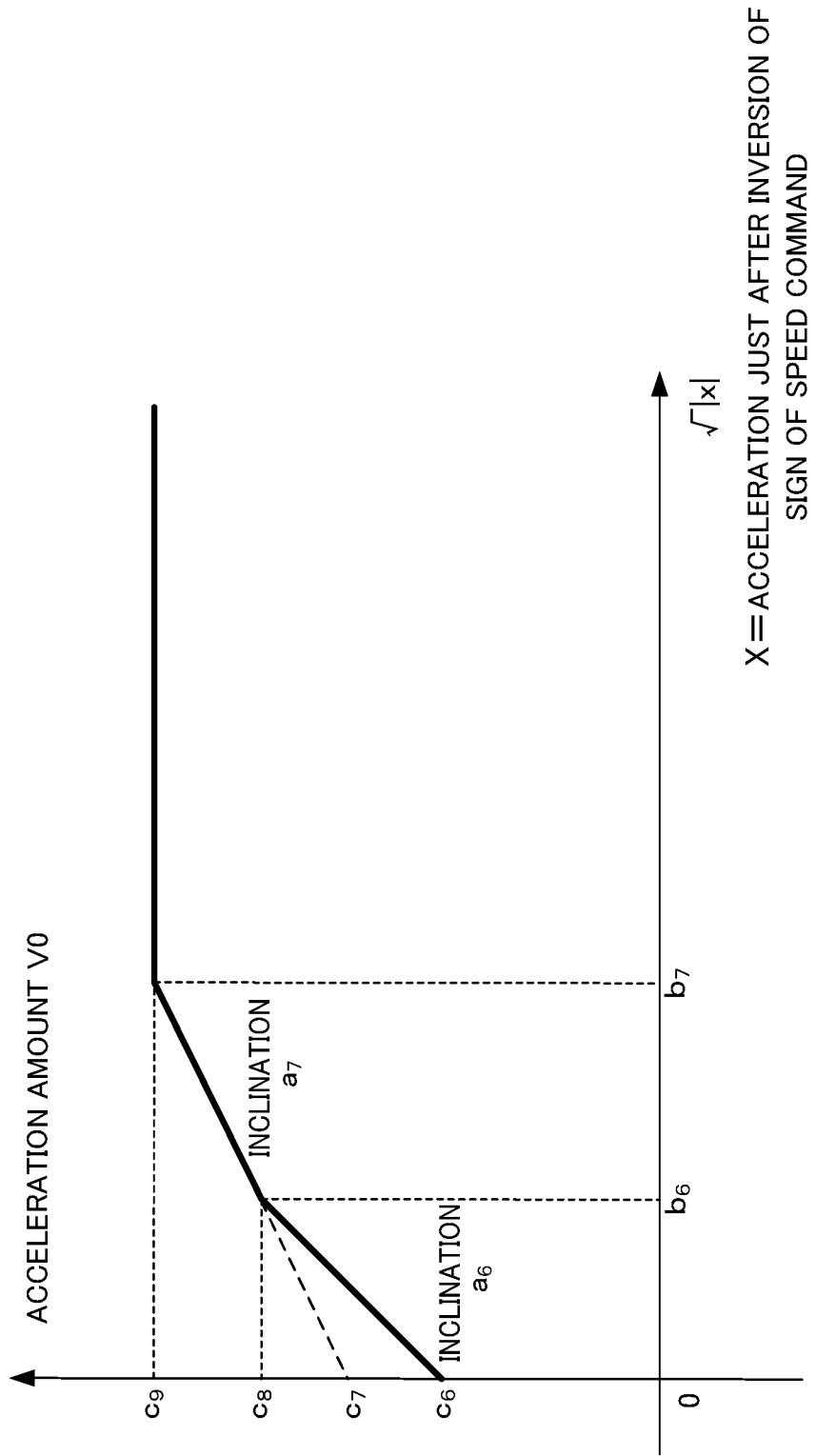
FIG. 7B is another diagram illustrating the relation between the magnitude of the acceleration amount V0 and a square root of acceleration in the backlash acceleration compensation.
Figure 7C:
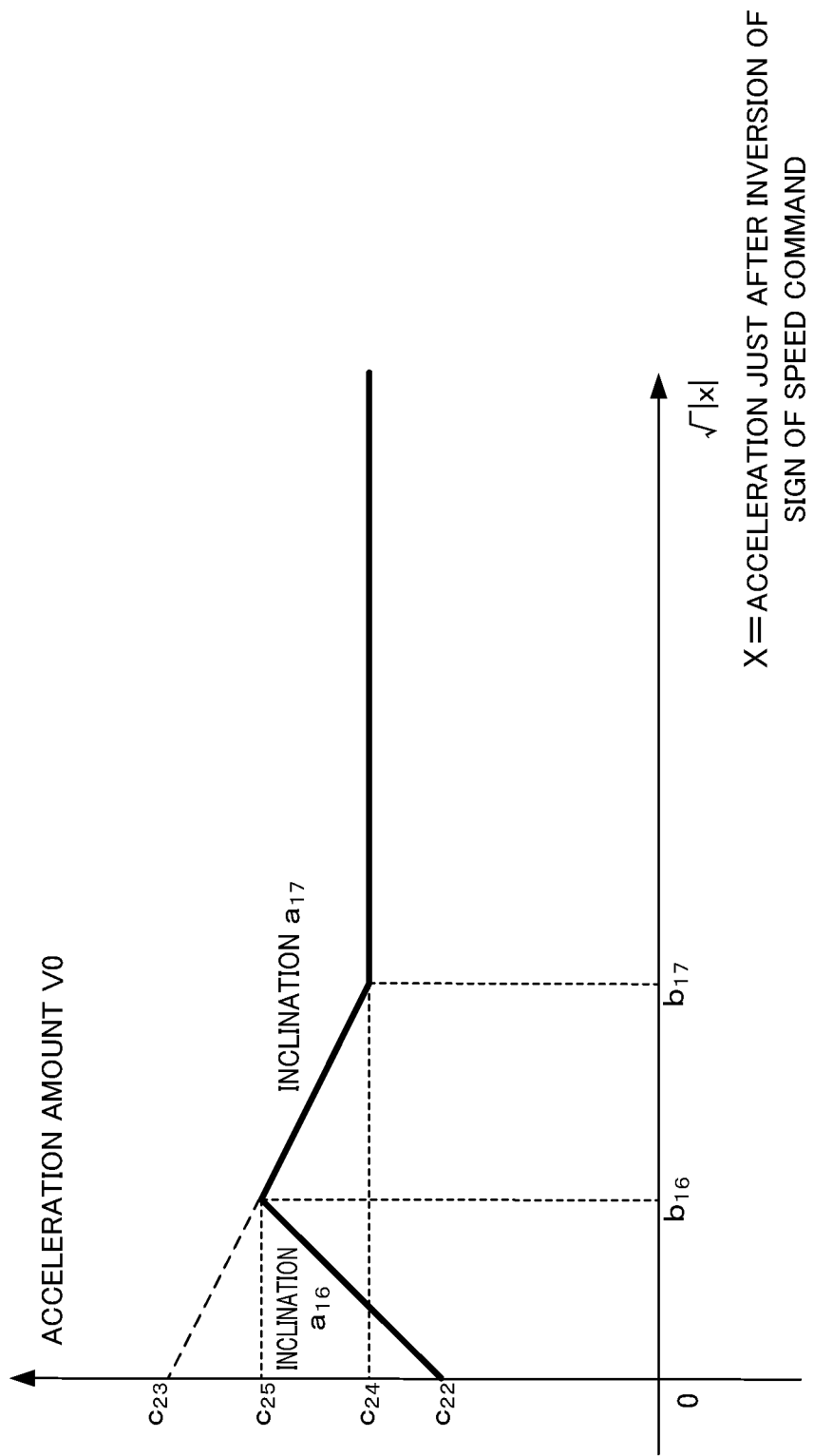
FIG. 7C is another diagram illustrating the relation between the magnitude of the acceleration amount V0 and a square root of acceleration in the backlash acceleration compensation.

For example, the relation between an acceleration amount V0 and a square root of an acceleration x: $\sqrt{|x|}$ may be the relation illustrated in the graph of FIG. 7B or FIG. 7C, other than the above. $a_i$, $b_i$ ($6 \leq i \leq 15$), and $c_i$ ($6 \leq i \leq 21$) are the parameters for the backlash acceleration compensation. For example, in the case where the relation between an acceleration amount V0 and a square root $\sqrt{|x|}$ of an acceleration x: corresponds to the relation illustrated in FIG. 7B, the relation in the range of $0 \leq \sqrt{|x|} < b_6$ is $V0 = a_6\sqrt{|x|} + c_6$, wherein $a_6$ (>0) denotes the inclination of the graph, and $c_6$ (>0) denotes the y-intercept.

The relation in the range of $b_6 \leq \sqrt{|x|} < b_7$ is $V0 = a_7\sqrt{|x|} + c_7$, $a_7$ (>0) denotes the inclination of the graph, and $c_7$ (>0) denotes the y-intercept, and $a_7 \neq a_6$, $c_7 \neq c_6$.

When $\sqrt{|x|} = b_6$, the relation is $a_6 \times b_6 + c_6 = a_7 \times b_6 + c_7 = c_8$.

In the range of $b_7\sqrt{|x|}$ and when $c_9 > 0$, the relation is $V0 = c_9$, being kept constant.

The relation expressed by use of the Heaviside step function as described above is $V0 = (a_6\sqrt{|x|}+c_6) \cdot H_{1/2}(b_6-\sqrt{|x|}) + (a_7\sqrt{|x|}+c_7) \cdot H_{1/2}((\sqrt{|x|}-b_6)(b_7-\sqrt{|x|})) + c_9 \cdot H_{1/2}(\sqrt{|x|}-b_7)$.  (Expression 7)

The values of TZ, T0, T1, and α, not only V0, are expressed by functions similar to the function above, as follows:

$TZ = (a_8\sqrt{|x|}+c_{10}) \cdot H_{1/2}(b_8-\sqrt{|x|}) + (a_9\sqrt{|x|}+c_{11}) \cdot H_{1/2}((\sqrt{|x|}-b_8)(b_9-\sqrt{|x|})) + c_{12} \cdot H_{1/2}(\sqrt{|x|}-b_9)$  (Expression 8)

$T0 = (a_{10}\sqrt{|x|}+c_{13}) \cdot H_{1/2}(b_{10}-\sqrt{|x|}) + (a_{11}\sqrt{|x|}+c_{14}) \cdot H_{1/2}((\sqrt{|x|}-b_{10})(b_{11}-\sqrt{|x|})) + c_{15} \cdot H_{1/2}(\sqrt{|x|}-b_{11})$  (Expression 9)

$T1 = (a_{12}\sqrt{|x|}+c_{16}) \cdot H_{1/2}(b_{12}-\sqrt{|x|}) + (a_{13}\sqrt{|x|}+c_{17}) \cdot H_{1/2}((\sqrt{|x|}-b_{12})(b_{13}-\sqrt{|x|})) + c_{18} \cdot H_{1/2}(\sqrt{|x|}-b_{13})$  (Expression 10)

$\alpha = (a_{14}\sqrt{|x|}+c_{19}) \cdot H_{1/2}(b_{14}-\sqrt{|x|}) + (a_{15}\sqrt{|x|}+c_{20}) \cdot H_{1/2}((\sqrt{|x|}-b_{14})(b_{15}-\sqrt{|x|})) + c_{21} \cdot H_{1/2}(\sqrt{|x|}-b_{15})$  (Expression 11)

$a_i$, $b_i$ (16≤i≤25), and $c_i$ (22≤i≤37) are the parameters for the backlash acceleration compensation. In the case where the relation between an acceleration amount V0 and a square root of an acceleration x: $\sqrt{|x|}$ corresponds to the relation illustrated in FIG. 7C, the relation in the range of $0 \leq \sqrt{|x|} < b_{16}$ is $$V0 = a_{16}\sqrt{|x|} + c_{22},$$

wherein $a_{16}$ (>0) denotes the inclination of the graph, and $c_{22}$ (>0) denotes the y-intercept. In the relation in the range of $b_{16} \leq \sqrt{|x|} < b_{17}$ is $$V0 = a_{17}\sqrt{|x|} + c_{23},$$

$a_{17}$ (<0) denotes the inclination of the graph, and $c_{23}$ (>0) denotes the y-intercept, and $c_{23} \neq c_{22}$.

When $\sqrt{|x|} = b_{16}$, the relation is $a_{16} \times b_{16} + c_{22} = a_{17} \times b_{16} + c_{23} = c_{25}$. In the range of $b_{17}\sqrt{|x|}$ and $c_{24} > 0$, the relation is $$V0 = c_{24},$$

being kept constant.

The relation expressed by use of the Heaviside step function as described above is $$V0 = (a_{16}\sqrt{|x|} + c_{22}) \cdot H_{1/2}(b_{16} - \sqrt{|x|}) + (a_{17}\sqrt{|x|} + c_{23}) \cdot H_{1/2}((\sqrt{|x|} - b_{16})(b_{17} - \sqrt{|x|})) + c_{24} \cdot H_{1/2}(\sqrt{|x|} - b_{17}). \quad \text{(Expression 12)}$$

The values of TZ, T0, T1, and α, not only V0, are also expressed by functions similar to the function above, as follows:

$$TZ = (a_{18}\sqrt{|x|} + c_{26}) \cdot H_{1/2}(b_{18} - \sqrt{|x|}) + (a_{19}\sqrt{|x|} + c_{27}) \cdot H_{1/2}((\sqrt{|x|} - b_{18})(b_{19} - \sqrt{|x|})) + c_{28} \cdot H_{1/2}(\sqrt{|x|} - b_{19}) \quad \text{(Expression 13)}$$

$$T0 = (a_{20}\sqrt{|x|} + c_{29}) \cdot H_{1/2}(b_{20} - \sqrt{|x|}) + (a_{21}\sqrt{|x|} + c_{30}) \cdot H_{1/2}((\sqrt{|x|} - b_{20})(b_{21} - \sqrt{|x|})) + c_{31} \cdot H_{1/2}(\sqrt{|x|} - b_{21}) \quad \text{(Expression 14)}$$

$$T1 = (a_{22}\sqrt{|x|} + c_{32}) \cdot H_{1/2}(b_{22} - \sqrt{|x|}) + (a_{23}\sqrt{|x|} + c_{33}) \cdot H_{1/2}((\sqrt{|x|} - b_{22})(b_{23} - \sqrt{|x|})) + c_{34} \cdot H_{1/2}(\sqrt{|x|} - b_{23}) \quad \text{(Expression 15)}$$

$$\alpha = (a_{24}\sqrt{|x|} + c_{35}) \cdot H_{1/2}(b_{24} - \sqrt{|x|}) + (a_{25}\sqrt{|x|} + c_{36}) \cdot H_{1/2}((\sqrt{|x|} - b_{24})(b_{25} - \sqrt{|x|})) + c_{37} \cdot H_{1/2}(\sqrt{|x|} - b_{25}) \quad \text{(Expression 16)}$$

As described above, the backlash acceleration compensating part 110 operates so as to perform compensation "for a while" based on the shape of a trapezoid shown in FIG. 6, on the basis of the acceleration amount V0, the calculation start time TZ, the acceleration time T0, the acceleration time T1, and the damping coefficient α, as well as the acceleration time T2, which are respectively obtained in the expressions (1) to (16) with a square root of an acceleration x: $\sqrt{|x|}$ just after the inversion of the sign of the speed command.

In the second reinforcement learning, the machine learning apparatus 200 learns the value Q for selecting as the action a the adjustment of the backlash acceleration compensation parameters $a_i$, $b_i$, $c_i$ and the acceleration time T2 in the state s, by setting as the state s the servo state including the position deviation information of the servo control apparatus 100 acquired upon execution of control according to the backlash acceleration compensation parameters and the position command during learning used at the time when the backlash acceleration compensating part 110 in the servo control apparatus 100 generates the backlash acceleration compensation value.

In the reinforcement learning with respect to the backlash acceleration compensation parameters, the value Q for selecting as the action a the adjustment (correction) of the backlash acceleration compensation parameters $a_i$, $b_i$, $c_i$ and the acceleration time T2 is learned.

On the basis of the backlash acceleration compensation parameters $a_i$, $b_i$, $c_i$ and the acceleration time T2, the machine learning apparatus 200 observes the state information s including the set of position deviation values obtained from the position commands and the fed-back position values of the case where the servo control apparatus 100 is made to execute the machining program during learning, and the backlash acceleration compensation parameters $a_i$, $b_i$, $c_i$ and the acceleration time T2, and then determines the next action a (adjustment of the backlash acceleration compensation parameters $a_i$, $b_i$, $c_i$ and the acceleration time T2). The machine learning apparatus 200 receives a reward every time the action a is performed. For example, the machine learning apparatus 200 makes a search for the optimal action a by trial and error, so that the total future reward is maximized. This processing allows the machine learning apparatus 200 to select the optimal action a, that is, the backlash acceleration compensation parameters $a_i$, $b_i$, $c_i$ and the acceleration time T2 with respect to the state information s including the servo state including the position deviation information of the servo control apparatus 100 obtained by making the servo control apparatus 100 execute the machining program during learning on the basis of the backlash acceleration compensation parameters $a_i$, $b_i$, $c_i$ and the acceleration time T2.

In such a way, in the second reinforcement learning, an action a is selected so that the value Q is maximized among the actions a applied to the backlash acceleration compensation parameters $a_i$, $b_i$, $c_i$ and the acceleration time T2 in a certain state s, on the basis of the value function Q learned by the machine learning apparatus 200, thereby enabling to perform the action a for minimizing the position deviation (that is, enabling to select the optimal backlash acceleration compensation parameters $a_i$, $b_i$, $c_i$ and the acceleration time T2 for the backlash acceleration compensating part 110).

It is noted that, the processing in the second reinforcement learning by the state information acquiring part 201, the learning part 202 (the reward output part 2021, the value function updating part 2022, and the action information generating part 2023), the action information output part 203, the value function storing part 204, and the optimal action information output part 205 is equivalent to the processing in the first reinforcement learning described above. That is, the machine learning apparatus 200 performs the reinforcement learning in which the backlash compensating part 109 is replaced with the backlash acceleration compensating part 110 and the backlash compensation parameter $P_0$ is replaced with the backlash acceleration compensation parameters $a_i$, $b_i$, $c_i$ and the acceleration time T2, in the above description about the first reinforcement learning. As described above, the use of the machine learning apparatus 200 according to the present invention facilitates the adjustment of the backlash acceleration compensation parameters of the backlash acceleration compensating part 110 of the servo control apparatus 100.

The functional blocks included in the servo control apparatus 100 and the machine learning apparatus 200 have been described above. In order to realize these functional blocks, each of the servo control apparatus 100 and the machine learning apparatus 200 includes an arithmetic processing unit such as a CPU (Central Processing Unit). Each of the servo control apparatus 100 and the machine learning apparatus 200 further includes an auxiliary storage device such as an HDD (Hard Disk Drive) for storing various control programs such as application software and OS (Operating System), a main storage device such as a RAM (Random Access Memory) for storing data temporarily required for executing such programs using the arithmetic processing unit.

In each of the servo control apparatus 100 and the machine learning apparatus 200, the arithmetic processing unit reads application software and the OS from the auxiliary storage device, develops the read application software and OS in the main storage device, and performs arithmetic processing based on the application software and OS. Various types of hardware included in each apparatus are controlled on the basis of the calculation result. In this manner, the functional blocks of the present embodiment are realized. That is, the present embodiment is enabled to be realized by the cooperation of hardware and software.

The machine learning apparatus 200 requires a large amount of computation associated with machine learning. Thus, for example, a personal computer equipped with a GPU (Graphics Processing Unit) may perform arithmetic processing associated with machine learning by a technique called GPGPU (General-Purpose computing on Graphics Processing Units), resulting in high-speed processing. In order to perform higher-speed processing, a computer cluster may be constructed with a plurality of computers equipped with such GPUs, thereby performing parallel processing by the plurality of computers included in the computer cluster.

Each of the above-described components included in a servo control part of the servo control apparatus and the machine learning apparatus is able to be realized by hardware, software, or a combination thereof. The servo control method performed by cooperation of the above-described respective components included in the servo control apparatus is also able to be realized by hardware, software, or a combination thereof. Herein, to be realized by software means to be realized when a computer reads and executes a program.

Programs are stored by use of various types of non-transitory computer readable media and are able to be supplied to a computer. Non-transitory computer readable media include various types of tangible storage media. Examples of the non-transitory computer readable media include: a magnetic recording medium (e.g. flexible disk, magnetic tape, hard disk drive); a magneto-optical recording medium (e.g. magneto-optical disk); CD-ROM (Read Only Memory); CD-R; CD-R/W; and semiconductor memory (e.g. Mask ROM, PROM (Programmable ROM), EPROM (Erasable PROM), flash ROM, and RAM (random access memory)). Programs may be supplied to a computer by various types of transitory computer readable media. Examples of transitory computer readable media include an electrical signal, an optical signal, and an electromagnetic wave. A transitory computer readable medium is capable of supplying a program to a computer via a wired communication path such as a wire and an optical fiber, or a wireless communication path.

Operation in Present Embodiment

The operation of the machine learning apparatus 200 in the first reinforcement learning with respect to the backlash compensation parameter is described below with reference to the block diagram of FIG. 8 and the flowchart of FIG. 9.

Figure 8:
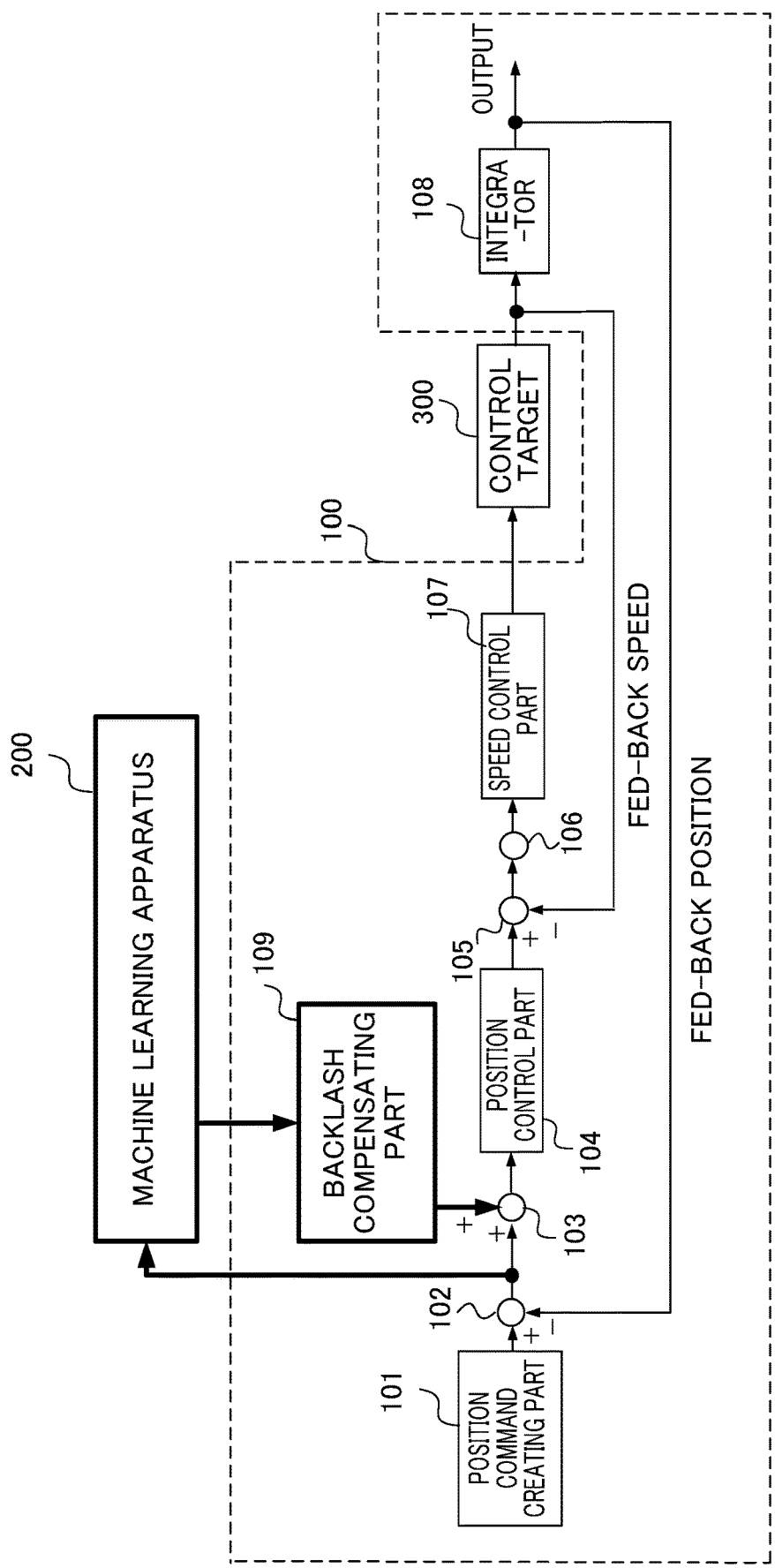
FIG. 8 is a block diagram illustrating a configuration example of the servo control apparatus 100 and the machine learning apparatus 200 during a first reinforcement learning.

In the first reinforcement learning with respect to the backlash compensation parameter, as indicated by the thick lines in FIG. 8, the machine learning apparatus 200 outputs the action information including the adjustment information of the backlash compensation parameter $P_0$ to the backlash compensating part 109 and makes the servo control apparatus 100 execute the machining program during learning on the basis of the action information, thereby observing the position deviation information.

Figure 9:
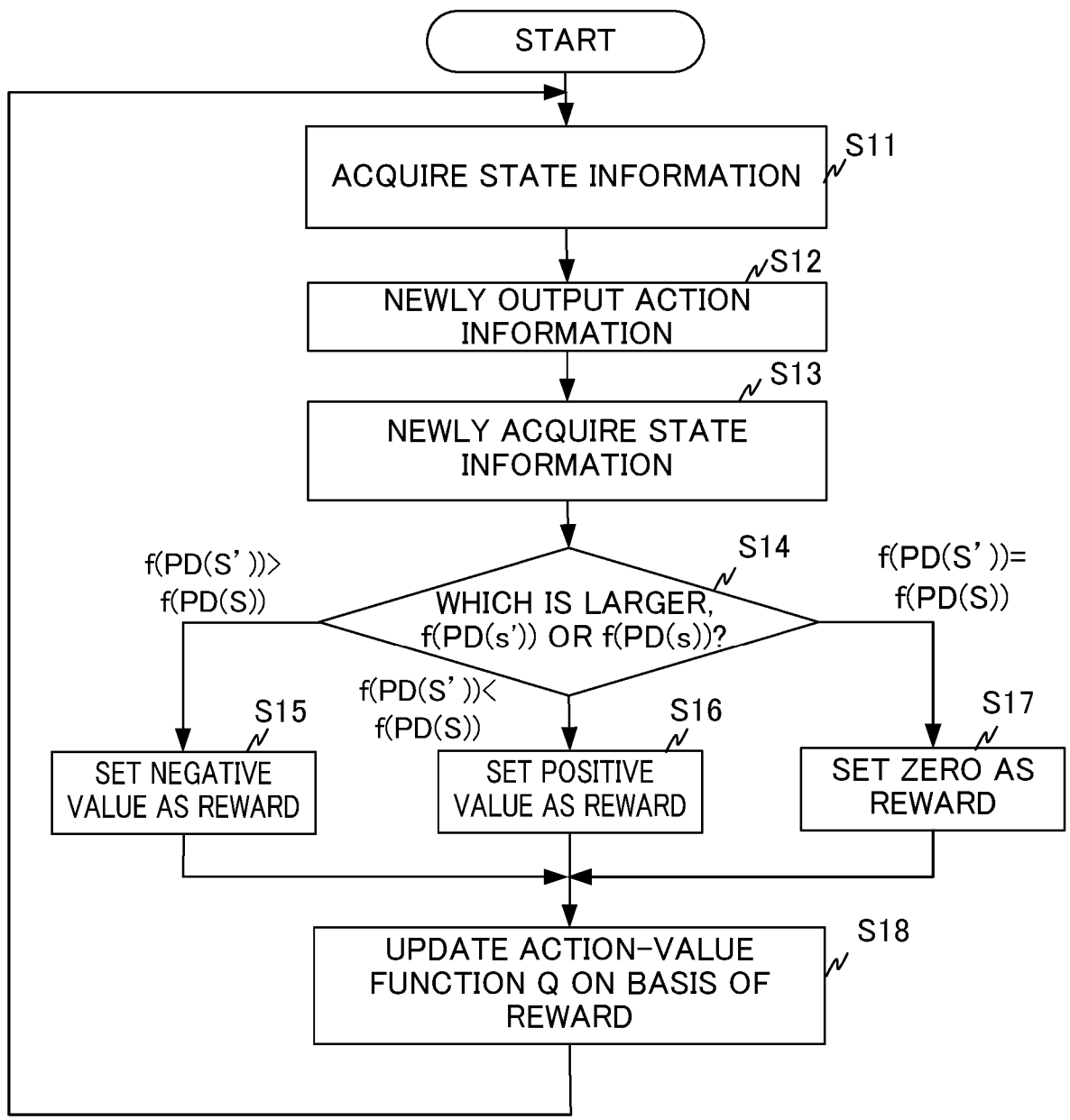
FIG. 9 is a flowchart for explaining the operation of the machine learning apparatus 200.

As shown in FIG. 9, in the first reinforcement learning, the state information acquiring part 201 acquires, in step S11, the state information s from the servo control apparatus 100 upon execution of the machining program during learning. The acquired state information is output to the value function updating part 2022 and the action information generating part 2023. As described above, the state information s, which is the information corresponding to the state in the Q-learning, includes the backlash compensation parameter $P_0$ in the backlash compensating part 109 at the time of step S11. As described above, the position deviation set PD(s) is acquired, which corresponds to the predetermined feed rate and the machining shape of a circle specified by the machining program during learning, at the time when the backlash compensation parameter $P_0$ is a default value.

A value $PD(s_0)$ of the position deviation input by the subtracter 102 in a state so at the time of initially starting the Q-learning is obtained when the servo control apparatus 100 is operated by use of the machining program during learning. It is noted that a machining program during learning prepares a plurality of feed rates that are variously changed, relevant to the rotation speed of the servo motor 302, as described above. The position command creating part 101 sequentially creates position commands by changing the feed rate on the basis of the predetermined machining shape specified by the machining program during learning, for example, on the basis of the machining shape of a circle, a square, or a square with quarter arc. For example, a position command value corresponding to the machining shape of a circle at a predetermined feed rate is output by the position command creating part 101, and the subtracter 102 outputs a difference between the position command value and the detection position output by the integrator 108 as the position deviation PD(so) to the machine learning apparatus 200.

In step S12, the action information generating part 2023 newly generates the action information a, and outputs the newly-generated action information a to the servo control apparatus 100 via the action information output part 203. The action information generating part 2023 outputs the newly-generated action information a on the basis of the above-described measures. It is noted that the servo control apparatus 100 that has received the action information a drives a machine tool including a servo motor in the state s' in which the backlash compensation parameter $P_0$ in the backlash compensating part 109 in the current state s has been corrected on the basis of the received action information.

In step S13, the state information acquiring part 201 acquires the position deviation PD(s') in the new state s' from the subtracter 102. In this manner, the state information acquiring part 201 acquires the position deviation set PD(s') of the case where the servo control apparatus is made to execute the machining program during learning on the basis of the backlash compensation parameter $P_0$ in the backlash compensating part 109 in the state s'. The acquired state information is output to the reward output part 2021.

In step S14, the reward output part 2021 compares the value f(PD(s')) of the position deviation in the state s' and the value f(PD(s)) of the position deviation in the state s. If f(PD(s'))>f(PD(s)), a negative value is set as the reward in step S15. If f(PD(s'))<f(PD(s)), a positive value is set as the reward in step S16. If f(PD(s'))=f(PD(s)), zero is set as the reward in step S17. It is noted that weighting may be performed on negative values and positive values of the reward.

When any one of step S15, step S16 and step S17 is finished, the value function updating part 2022 updates, in step S18, the action-value function Q stored by the value function storing part 204, on the basis of the value of the reward calculated in any one of the steps. Then, the processing returns to step S11 again to repeat the above processing, whereby the action-value function Q converges into an appropriate value. It is noted that the processing may be ended on condition that the above-described processing is repeated a predetermined number of times or for a predetermined period of time. Although online updating is indicated as an example of step S18, batch updating or mini-batch updating may be substituted for online updating.

As described above, in the present embodiment, the first reinforcement learning described with reference to FIG. 8 and FIG. 9 facilitates the acquisition of the optimal value of the backlash compensation parameter $P_0$ by use of the machine learning apparatus 200.

Figure 10:
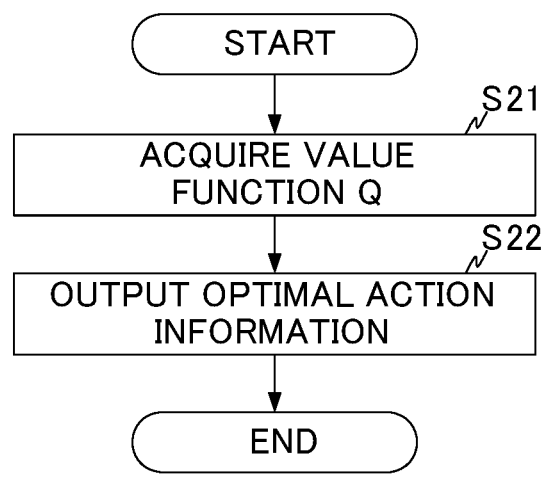
FIG. 10 is a flowchart for explaining the operation of an optimal action information output part 205 of the machine learning apparatus 200.

The description below with reference to the flowchart of FIG. 10 is about the operation at the time when the optimal action information output part 205 generates the optimal action information. First, in step S21, the optimal action information output part 205 acquires the action-value function Q stored by the value function storing part 204. The action-value function Q has been updated upon performance of the Q-learning by the value function updating part 2022 as described above.

In step S22, the optimal action information output part 205 generates the optimal action information on the basis of the action-value function Q and outputs the generated optimal action information to the backlash compensating part 109 of the servo control apparatus 100. Then, the first reinforcement learning is finished.

The description below is about the operation of the machine learning apparatus 200 in the second reinforcement learning with respect to the backlash acceleration compensation parameters $a_i$, $b_i$, $c_i$ and the acceleration time T2. The machine learning apparatus 200 is capable of easily acquiring the optimal values of the backlash acceleration compensation parameters $a_i$, $b_i$, $c_i$, and T2 also in the second reinforcement learning with respect to the backlash acceleration compensation parameters, according to the same operation flow as in the flowchart of FIG. 9.

Figure 11:
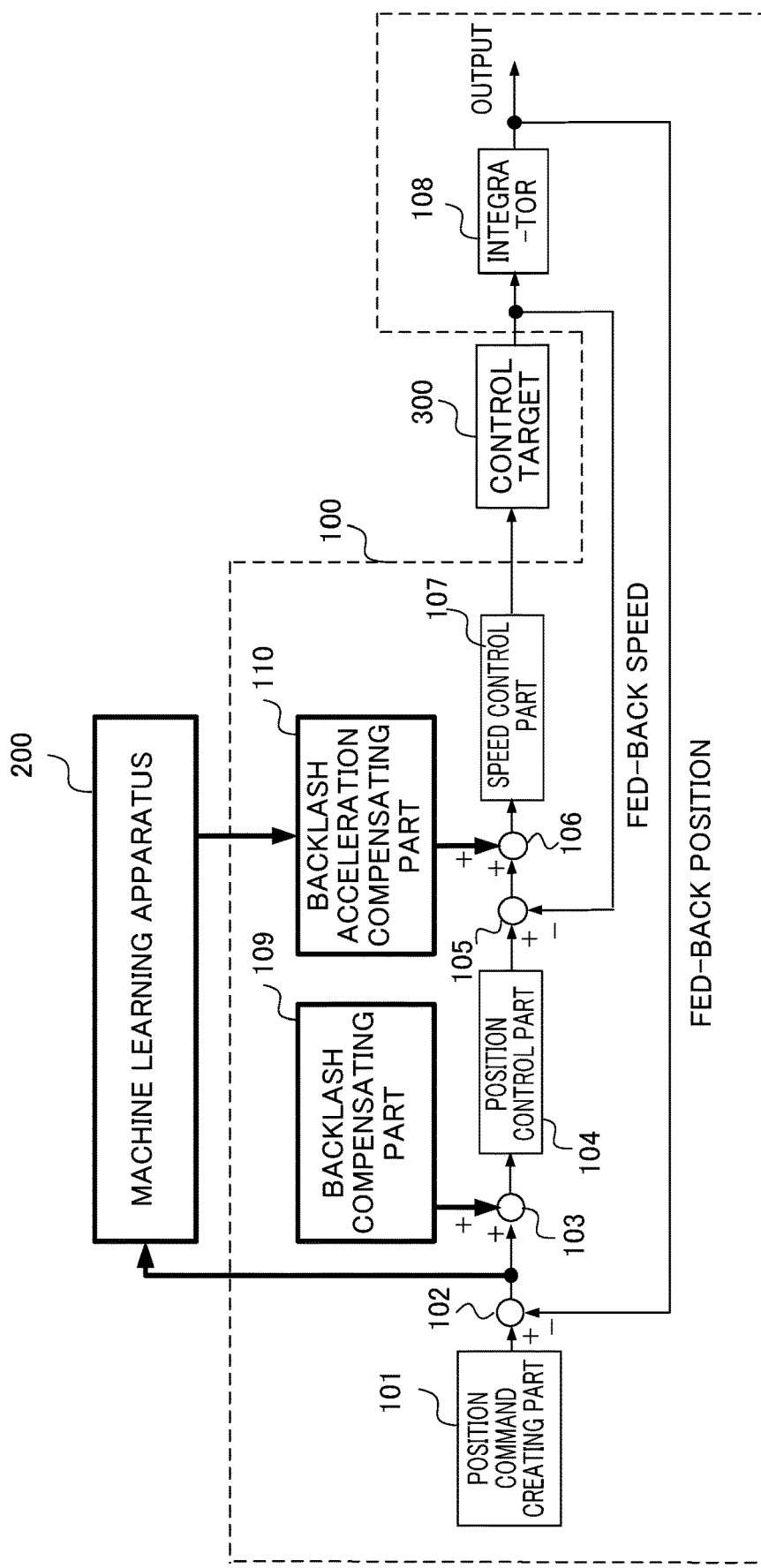
FIG. 11 is a block diagram illustrating a configuration example of the servo control apparatus 100 and the machine learning apparatus 200 during a second reinforcement learning.

It is noted that, in the second reinforcement learning with respect to the backlash acceleration compensation parameters, as indicated by a thick line in FIG. 11, the backlash compensating part 109 outputs the backlash compensation value to the adder 103 by applying the backlash compensation value $P_0$ optimized in the first reinforcement learning. Then, the machine learning apparatus 200 outputs to the backlash acceleration compensating part 110 the action information including the adjustment information on the backlash acceleration compensation parameters $a_i$, $b_i$, $c_i$ and the acceleration time T2, and makes the servo control apparatus 100 execute the machining program during learning on the basis of the action information, thereby observing the position deviation information.

Figure 12:
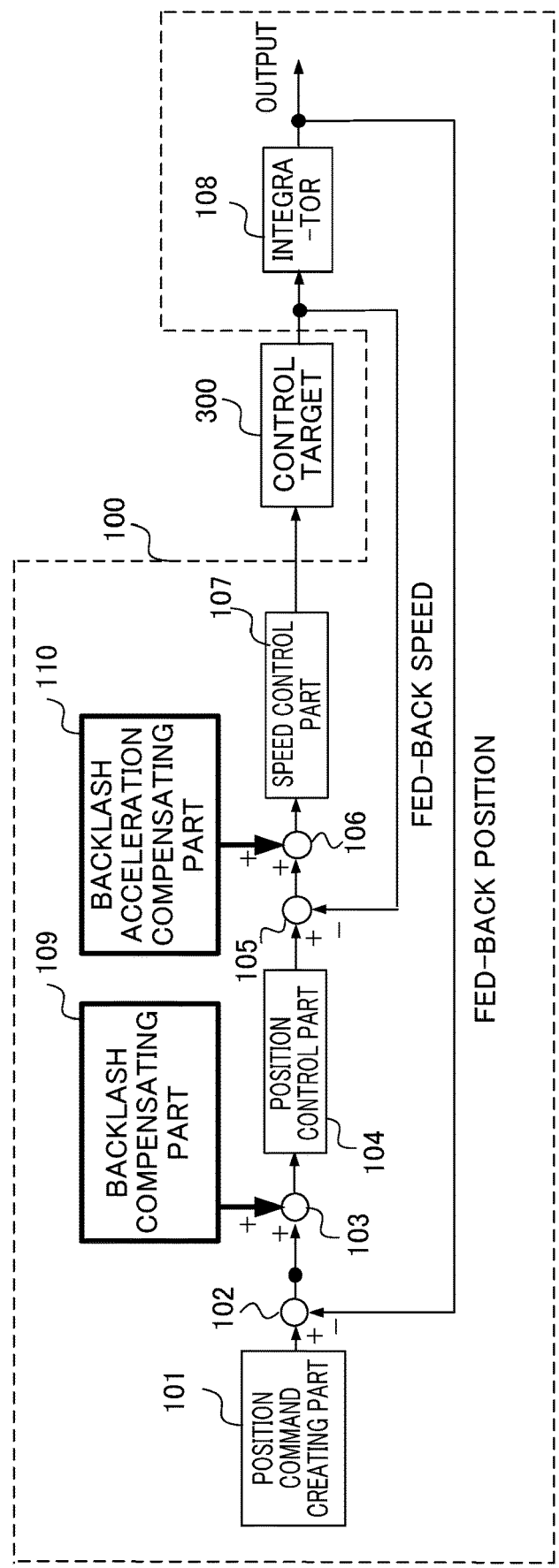
FIG. 12 is a block diagram illustrating a configuration example of the servo control apparatus 100 in the operation after completion of the machine learning.

It is noted that, the operation in the second reinforcement learning of the state information acquiring part 201, the learning part 202 (the reward output part 2021, the value function updating part 2022, and the action information generating part 2023), the action information output part 203, the value function storing part 204, and the optimal action information output part 205 is equivalent to the operation in the above-described first reinforcement learning. That is, the machine learning apparatus 200 performs the reinforcement learning in which the backlash compensating part 109 is replaced with the backlash acceleration compensating part 110 and the backlash compensation parameter $P_0$ is replaced with the backlash acceleration compensation parameters $a_i$, $b_i$, $c_i$ and the acceleration time T2 in the above description about the operation of the first reinforcement learning. In this manner, in the second reinforcement learning, optimal values of the backlash acceleration compensation parameters $a_i$, $b_i$, $c_i$, and T2 are easily acquired. After the second reinforcement learning with respect to the backlash acceleration compensation parameters, the backlash acceleration compensating part 110 applies the backlash acceleration compensation parameters $a_i$, $b_i$, $c_i$, and T2 optimized in the second reinforcement learning, to output the backlash acceleration compensation value to the adder 106 as shown by a thick line in FIG. 12.

Although the above-described embodiment is a preferred embodiment of the present invention, the scope of the present invention is not limited only to the above-described embodiment. Various types of modification can be made within the scope without departing from the gist of the present invention.

<Modification Example in which a Servo Control Apparatus Includes a Machine Learning Apparatus>

In the embodiment described above, the machine learning apparatus 200 is configured as an apparatus separate from the servo control apparatus 100. Alternatively, some or all of the functions of the machine learning apparatus 200 may be realized by the servo control apparatus 100.

<Freedom in System Configuration>

In the embodiment described above, the machine learning apparatus 200 and the servo control apparatus 100 are communicably connected as a one-to-one pair. Alternatively, for example, one unit of a machine learning apparatus 200 and a plurality of servo control apparatuses 100 may be communicably connected via a network 400 so that the machine learning is performed to each of the servo control apparatuses 100. In this case, a distributed processing system may be adopted, in which respective functions of the machine learning apparatus 200 are distributed to a plurality of servers as is appropriate. Alternatively, respective functions of the machine learning apparatus 200 may be realized by use of a virtual server function or the like in the cloud. In the case of a configuration including a plurality of servo control apparatuses 100-1 to 100-$n$ having the same model name or the same specification or in the same series, and a plurality of machine learning apparatuses 200-1 to 200-$n$ respectively corresponding thereto, the learning results by the respective machining learning apparatuses 200-1 to 200-$n$ may be shared. Such a configuration enables to build a more optimal model.

EXPLANATION OF REFERENCE NUMERALS

10 SERVO CONTROL SYSTEM
100 SERVO CONTROL APPARATUS
101 POSITION COMMAND CREATING PART
102 SUBTRACTER
103 ADDER
104 POSITION CONTROL PART
105 SUBTRACTER
106 ADDER
107 SPEED CONTROL PART
108 INTEGRATOR
109 BACKLASH COMPENSATING PART
110 BACKLASH ACCELERATION COMPENSATING PART
200 MACHINE LEARNING APPARATUS

201 STATE INFORMATION ACQUIRING PART
202 LEARNING PART
203 ACTION INFORMATION OUTPUT PART
204 VALUE FUNCTION STORING PART
205 OPTIMAL ACTION INFORMATION OUTPUT PART
300 CONTROL TARGET
400 NETWORK
2021 REWARD OUTPUT PART
2022 VALUE FUNCTION UPDATING PART
2023 ACTION INFORMATION GENERATING PART

What is claimed is:

1. A machine learning apparatus for performing reinforcement learning to a servo control apparatus using a backlash compensation parameter and a backlash acceleration compensation parameter, the servo control apparatus creating a backlash compensation value compensating a position command or a position deviation, the servo control apparatus creating a backlash acceleration compensation value compensating a speed command, the machine learning apparatus comprising:
a processor; and
a non-transitory memory having stored thereon executable instructions, which when executed, cause the processor to perform:
outputting, to the servo control apparatus, action information including adjustment information on the backlash compensation parameter and the backlash acceleration compensation parameter;
acquiring, from the servo control apparatus, state information including position deviation and the backlash compensation parameter and the backlash acceleration compensation parameter, the position deviation being obtained from the position command and a fed-back position, at a time of making the servo control apparatus execute a predetermined machining program on the basis of the action information;
outputting a reward value in the reinforcement learning on the basis of the position deviation included in the state information; and
updating an action-value function on the basis of the reward value, the state information, and the action information,
wherein the reinforcement learning is performed for the backlash compensation parameter, and then the reinforcement learning is performed for the backlash acceleration compensation parameter.

2. The machine learning apparatus according to claim 1, wherein the processor outputs the reward value on the basis of an absolute value of the position deviation.

3. The machine learning apparatus according to claim 1, wherein the executable instructions further cause the processor to perform generating and outputting the backlash compensation parameter and the backlash acceleration compensation parameter on the basis of the updated action-value function.

4. The servo control apparatus including the machine learning apparatus according to claim 1.

5. A servo control system including the machine learning apparatus and the servo control apparatus according to claim 1.

6. A machine learning method for a machine learning apparatus to perform reinforcement learning to a servo control apparatus using a backlash compensation parameter and a backlash acceleration compensation parameter, the servo control apparatus creating a backlash compensation value compensating a position command or a position deviation, the servo control apparatus creating a backlash acceleration compensation value compensating a speed command, the machine learning method comprising:
outputting, to the servo control apparatus, action information including adjustment information on the backlash compensation parameter and the backlash acceleration compensation parameter;
acquiring, from the servo control apparatus, state information including position deviation and the backlash compensation parameter and the backlash acceleration compensation parameter, the position deviation being obtained from the position command and a fed-back position, at a time of making the servo control apparatus execute a predetermined machining program on the basis of the action information;
outputting a reward value in the reinforcement learning on the basis of the position deviation included in the state information; and
updating an action-value function on the basis of the reward value, the state information, and the action information,
wherein the reinforcement learning is performed for the backlash compensation parameter, and then the reinforcement learning is performed for the backlash acceleration compensation parameter.

* * * * *